(12) United States Patent
An et al.

(10) Patent No.: US 7,691,520 B2
(45) Date of Patent: Apr. 6, 2010

(54) FUEL CELL SYSTEM

(75) Inventors: Seongjin An, Suwon-si (KR);
Yeongchan Eun, Suwon-si (KR);
Seokrak Chang, Suwon-si (KR); Gilltae Roh, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 12/031,095

(22) Filed: Feb. 14, 2008

(65) Prior Publication Data

US 2008/0233458 A1     Sep. 25, 2008

(30) Foreign Application Priority Data

Mar. 22, 2007    (KR) ..................... 10-2007-0028284

(51) Int. Cl.
*H01M 2/14*    (2006.01)
(52) U.S. Cl. .............................. 429/39; 429/13; 429/26; 429/32; 429/34; 429/38
(58) Field of Classification Search ................... 429/13, 429/26, 34, 32, 38, 39; *H01M 8/00, 8/02, H01M 8/04, 2/00, 8/10, 2/14*
See application file for complete search history.

(56) References Cited

U.S. PATENT DOCUMENTS

| 2004/0166391 | A1* | 8/2004 | Nakamura et al. | 429/34 |
| 2004/0175608 | A1* | 9/2004 | Lisi et al. | 429/38 |
| 2007/0009781 | A1* | 1/2007 | Dong | 429/38 |

FOREIGN PATENT DOCUMENTS

| JP | 61-013575 | 1/1986 |
| KR | 10-2003-0075755 A | 9/2003 |
| KR | 10-2004-0106573 A | 12/2004 |
| KR | 10-2005-0122768 A | 12/2005 |
| KR | 10-2007-0073531 A | 7/2007 |

* cited by examiner

*Primary Examiner*—Jerry Lorengo
*Assistant Examiner*—Carlos Barcena
(74) *Attorney, Agent, or Firm*—Knobbe, Martens, Olson & Bear LLP

(57) ABSTRACT

A fuel cell system including a flat type stack in which a plurality of unit cells, in which an electricity generating reaction is performed, are arranged on a plane, and the fuel cell system pre-heats the fuel provided from the outside for reducing the temperature differences of the fuel provided to each unit cell, thereby reduces the differences in the output characteristics of each unit cell, thereby increasing the electricity generating efficiency of the system.

23 Claims, 13 Drawing Sheets

FUEL CELL SYSTEM

CROSS-REFERENCE TO RELATED APPLICATION

This application claims priority to and the benefit of Korean Patent Application No. 10-2007-0028284, filed on Mar. 22, 2007, the entire contents of which is incorporated herein by reference.

BACKGROUND OF THE INVENTION

1. Technical Field

The present disclosure relates generally to a fuel cell system, and in particular, relates to a fuel cell system including a flat-type stack in which a plurality of the unit cells, in which an electricity generating reaction occurs, are arranged on a plane, and in which the fuel is preheated, thereby reducing the temperature differences of the fuel provided to each unit cell, and reducing the difference in the output characteristics of each unit cell, thereby increasing the electrical generating efficiency.

2. Description of the Related Art

A fuel cell is a power generation system that directly converts energy from a chemical reaction between a hydrogen-containing fuel, for example, a hydrocarbon-based material such as methanol, ethanol, and natural gas, and an oxidant into electrical energy. Examples of fuel cell systems include Polymer Electrolyte Membrane Fuel Cell (hereinafter, referred to as PEMFC) systems and a Direct Methanol Fuel Cell (hereinafter, referred to as DMFC) systems.

DMFC systems generate electricity by an electrochemical reaction between oxygen from an oxidizing agent and a methanol fuel provided directly to a stack. The DMFC system has a high energy density and a high power density, and since a liquid fuel such as a methanol or the like is used, DMFC systems advantageously do not need additional devices such as a reformer. Storage and supply of the fuel is also easy.

In the DMFC system, the stack that actually generates electricity has a structure in which at least one unit cell including a membrane-electrode assembly (hereinafter referred to as an "MEA"), and a separator or a bipolar plate are stacked. The MEA comprises an electrolyte membrane interposed between an anode electrode and a cathode electrode. Furthermore, each of the anode electrode and the cathode electrode is provided with a fuel diffusion layer for supplying and diffusing fuel to a catalyst layer, a catalyst layer where the oxidation/reduction reaction of fuel occurs, and an electrode support body.

Various kinds of the DMFC systems geometries may be formed in accordance with the method of supplying the air and the arrangement of the unit cells Some embodiments comprise a flat-stack type in which a plurality of unit cells is generally arranged on a plane. A flat-stack type fuel cell system is also referred to as a "passive" or a "semi-passive" type since it does not require a pump for providing the air.

A flat-stack type fuel cell system is typically formed in the shape of a plate with the plurality of unit cells arranged on a plane. Each unit cell comprises a cathode to which the air is supplied, and an anode to which the fuel is supplied. The cathode is supplied with the air by natural diffusion or convection of air, and the anode is supplied with fuel from outside the unit cell by a pump. Here, since the unit cells are arranged on a plane, the fuel is sequentially supplied from a unit cell on one side of the stack to a unit cell on the other side of the stack. Therefore, in the unit cell, the temperature of fuel in a unit cell depending on the position thereof. That is, in the flat stack, a unit cell arranged at the fuel supply opening receives fuel at a normal temperature, which is relatively low. However, the fuel is heated in the unit cell by the heat generated during the electricity generating reaction, and then flows to downstream unit cells in the flat stack. Therefore, a unit cell that is far from the fuel supply opening receives fuel at a relatively high temperature.

On the other hand, the electricity generating reaction that occurs in the unit cell is in turn affected by the temperature of the fuel. Therefore, in the flat-stack type fuel cell system, the output characteristics of the unit cell change depending on differences in the fuel temperature. In addition, the output and efficiency of a flat-stack type fuel cell system are reduced due to differences in the output characteristics of each unit cell.

SUMMARY OF THE INVENTION

Some embodiments address one or more of the above-mentioned problems. An aspect provides a fuel cell system including a flat type stack in which a plurality of the unit cells, in which an electricity generating reaction is performed, are arranged on a plane, and the fuel cell system pre-heats the fuel provided from outside the stack for reducing the temperature differences of the fuel provided to each unit cell, and reducing the difference of the output characteristics of each unit cell, thereby increasing the electricity generating efficiency.

In order to accomplish the above aspects, an embodiment of the fuel cell system comprises a fuel cell body comprising; a middle plate comprising a plurality of unit sections; an inlet opening formed in each of the unit sections for providing fuel; an outlet opening formed in each of the unit sections for discharging fuel; a supply passage coupled to the inlet openings; a middle passage coupled to the supply passage and formed in the inside of the region in which the unit section is formed; a discharge passage coupled to a discharge opening; a supply opening coupled to the middle passage and provided with fuel from outside the stack; a middle plate that has a discharge opening and is coupled to the discharge passage through which fuel is discharged to outside the stack; and an unit cell that is mounted on the unit section for generating electricity by reaction of the provided fuel and air. Here, the middle plate is in the form of a plate including a first surface that is a front surface, a second surface that is a back surface, a third surface that is a one side surface, a fourth surface that is the other side surface, a fifth surface that is an upper surface, and a sixth surface that is a lower surface, and the unit section is formed as a coupling groove in a groove shape on the first surface and the second surface.

In some embodiments, the supply passage extends in the direction of the third surface from the fourth surface in the inside of the lower portion of the middle plate; the discharge passage extends in the direction of the fourth surface from the third surface in the inside of the upper portion of the middle plate; and the middle passage is formed in a zigzag shape in the inside of the middle plate.

In some embodiments, the supply opening is formed on the other side of the fifth surface, and the discharge opening is formed on the upper portion of the third surface, and thus is coupled to one side of the discharge passage; and the middle passage comprises a first passage extending from the supply opening to the sixth surface direction; a second passage extending from the first passage to the third surface direction; a third passage extending from the second passage to the sixth surface direction; a fourth passage extending from the third passage to the fourth surface direction; and a fifth passage extending from the fourth passage to the sixth surface direction and coupled to the supply opening.

In some embodiments, the middle passage may be composed of a middle groove in a trench shape that is formed on the first surface of the middle plate, and a middle groove cover formed in the shape corresponding to the middle groove and coupled to the middle groove.

In some embodiments, the middle plate may comprise a first plate and a second plate facing each other; and the middle passage is formed by coupling a first groove and a second groove that are formed in the inner surface of the first plate and the second plate in a groove shape.

In some embodiments, the supply passage may be formed by a third groove and a fourth groove which are formed in a groove shape in the inside surface of the first plate and the second plate; and the discharge opening is formed by a fifth groove and a sixth groove which are formed in the inner surface of the first plate and the second plate in a groove shape. The supply opening and the discharge opening are formed on the third surface; and the middle passage and the first passage coupled to the supply opening extend to the fourth surface direction in parallel with the discharge passage.

In some embodiments, the middle passage may comprise a second passage extending in the direction of the sixth surface direction from the first passage; a third passage extending in the direction of the third surface direction from the second passage; a fourth passage extending in the direction of the sixth surface direction from the third passage; and a fifth passage extending in the direction of the fourth surface direction from the fourth passage; and a sixth passage extending in the direction of the sixth direction from fifth passage and coupled to the supply passage.

In some embodiments, the supply opening may be formed on the other side of the fifth surface; the discharge opening is formed adjacent to the supply opening on the fifth surface, and is coupled to the other side of the discharge passage; and the middle passage comprises a first passage extending in the direction of the sixth surface direction from the supply opening; a second passage extending in the direction of the third surface from the first passage; a third passage extending in the direction of the sixth surface from the second passage; and a fourth passage extending in the direction of the fourth surface from the third passage; and a fifth passage extending in the direction of the sixth direction from fourth passage and coupled to the supply passage.

In some embodiments, the middle passage may comprise an upper middle passage formed on the upper portion on the basis of the horizontal direction of the middle plate, a lower middle passage formed on the lower portion, and a plurality of vertical middle passages coupled to the upper and the lower middle passages; and the height of the upper middle passage may be higher than that of the lower middle passage. Here, the supply opening is formed on the other side of the fifth surface, the discharge opening is formed adjacent to the supply opening on the other side of the fifth surface, and is coupled to the other side of the discharge passage.

In some embodiments, the inlet openings may be formed at the side of the fourth surface in the lower portion of the coupling groove of each of unit sections, and the outlet openings is formed at the side of the third surface in the upper portion of the coupling groove of each of unit sections.

In some embodiments, the unit cell may comprise an anode part comprising a fuel passageway and arranged closely to the unit section; a membrane-electrode assembly arranged closely to the anode part; and a cathode part comprising an air passageway for allowing the air to be flowed and arranging closely to the membrane-electrode assembly.

Further, some embodiments may comprise a case surrounding the fuel cell body entirely in which an air hole is formed on the region corresponding to the cathode part, a fuel pump for providing fuel to the fuel cell body, and a fuel tank coupled to the fuel pump.

Further, some embodiments may comprise a fuel pump for providing fuel to the fuel cell body, and a fuel tank coupled to the fuel pump.

Some embodiments provide a fuel cell system comprising: a fuel cell body comprising; a middle plate comprising a plurality of unit sections; an inlet opening formed in each unit section configured for providing fuel thereto; an outlet opening formed in each unit sections configured for discharging fuel therefrom; a supply passage coupled to the inlet openings; a middle passage coupled to the supply passage and formed inside of a region in which the unit sections are formed; a discharge passage coupled to the discharge openings; a supply opening coupled to the middle passage and configured for providing fuel thereto; a discharge opening coupled to the discharge passage configured for discharged therefrom; and an unit cell mounted on the unit section configured for generating electricity by reaction between fuel and air.

In some embodiments, the middle plate comprises: a plate comprising: a first surface which is a front surface; a second surface which is a back surface; a third surface which is a first side surface; a fourth surface which is a second side surface; a fifth surface which is an upper edge surface; and a sixth surface which is a lower edge surface, wherein the unit section comprises a groove-shaped coupling groove, and unit sections are disposed on the first surface and the second surface.

In some embodiments, the supply passage extends towards the third surface from the fourth surface inside the lower portion of the middle plate; the discharge passage extends towards the fourth surface from the third surface inside of the upper portion of the middle plate; and the middle passage comprises a zigzag or serpentine shape inside of the middle plate.

In some embodiments, the supply opening is formed on a side of the fifth surface, and the discharge opening is formed on an upper portion of the third surface and is coupled to a side of the discharge passage; and the middle passage comprises a first passage extending from the supply opening towards the sixth surface; a second passage extending from the first passage towards the third surface; a third passage extending from the second passage towards the sixth surface; a fourth passage extending from the third passage towards the fourth surface; and a fifth passage extending from the fourth passage towards the sixth surface direction and coupled to the supply opening.

In some embodiments, the middle passage comprises a trench-shaped middle groove disposed on the first surface of the middle plate, and a middle groove cover corresponding in shape and dimension to the middle groove and coupled to the middle groove.

In some embodiments, the middle plate comprises a first plate and a second plate facing each other; and the middle passage is formed by coupling a first groove and a correspondingly shaped second groove disposed on the facing surfaces of the first plate and the second plate, respectively.

In some embodiments, the supply passage is formed by a third groove and a correspondingly shaped fourth groove disposed on the facing surfaces of the first plate and the second plate, respectively; and the discharge opening is formed by a fifth groove and a correspondingly shaped sixth groove disposed on the facing surfaces of the first plate and the second plate, respectively.

In some embodiments, the supply opening and the discharge opening are formed on the third surface; and the middle passage comprises a first passage coupled to the supply opening, extending towards the fourth surface in parallel with the discharge passage.

In some embodiments, the middle passage comprises a second passage extending towards the sixth surface from the first passage; a third passage extending towards the third surface from the second passage; a fourth passage extending towards the sixth surface from the third passage; a fifth passage extending towards the fourth surface from the fourth passage; and a sixth passage extending towards the sixth from fifth passage and coupled to the supply passage.

In some embodiments, the supply opening is formed on a side of the fifth surface; the discharge opening is adjacent to the supply opening on the fifth surface, and is coupled to the discharge passage; and the middle passage comprises a first passage extending towards the sixth surface from the supply opening; a second passage extending towards the third surface from the first passage; a third passage extending towards the sixth surface from the second passage; a fourth passage extending towards fourth surface from the third passage; and a fifth passage extending towards the sixth direction from fourth passage and coupled to the supply passage.

In some embodiments, the middle passage comprises an upper middle passage formed on an upper portion of the middle plate, a lower middle passage formed on a lower portion of the middle plate, and a plurality of vertical middle passages coupled to the upper and the lower middle passages; the upper middle passage is higher than the lower middle passage; and the upper portion and lower portion of the middle plate are defined by a horizontal line bisecting the middle plate.

In some embodiments, the supply opening is formed on a side of the fifth surface, and the discharge opening is formed adjacent to the supply opening on the side of the fifth surface, and is coupled to the discharge passage.

In some embodiments, the middle passage comprises an upper middle passage formed on an upper portion of the middle plate, a lower middle passage formed on a lower portion of the middle plate, and a plurality of vertical middle passages coupled to the upper and the lower middle passages; and a cross-sectional area of the upper middle passage is larger than a cross-sectional area of the lower middle passage, wherein the upper portion and lower portion of the middle plate are defined by a horizontal line bisecting the middle plate.

In some embodiments, the supply opening is formed on a side of the fifth surface, and the discharge opening is adjacent to the supply opening on the side of the fifth surface, and is coupled to the discharge passage.

In some embodiments, the middle passage comprises an upper middle passage formed on an upper portion of the middle plate; a lower middle passage formed on a lower portion of the middle plate; and a plurality of vertical middle passages coupled to the upper and the lower middle passages; and the upper middle passage is higher than the supply passage, wherein the upper portion and lower portion of the middle plate are defined by a horizontal line bisecting the middle plate.

In some embodiments, the supply opening is formed on a side of the fifth surface, and the discharge opening is adjacent to the supply opening on the side of the fifth surface, and is coupled to the discharge passage.

In some embodiments, the middle passage comprises an upper middle passage formed on an upper portion; a lower middle passage formed on a lower portion of the middle plate; and a plurality of vertical middle passages coupled to the upper and the lower middle passages; and a vertical cross-sectional area of the upper middle passage is larger than a vertical cross-sectional area of the supply passage, wherein the upper portion and lower portion of the middle plate are defined by a horizontal line bisecting the middle plate.

In some embodiments, the supply opening is formed on a side of the fifth surface, the discharge opening is adjacent to the supply opening on the side of the fifth surface, and is coupled to the discharge passage.

In some embodiments, the inlet openings are on a lower portion of the coupling groove of each of unit section proximal to the fourth surface. In some embodiments, the outlet openings are on the upper portion of the coupling groove of each of unit section proximal to the third surface.

In some embodiments, the unit cell comprises: an anode part comprising a fuel passageway and arranged closely to the unit section; a membrane-electrode assembly arranged closely to the anode part; and a cathode part comprising an air passageway configured for allowing airflow therethrough and arranged closely to the membrane-electrode assembly.

Some embodiments further comprise a case in which an air hole is formed on a region corresponding to the cathode part, and surrounding the fuel cell body entirely. Some embodiments further comprise a fuel pump configured for providing fuel to the fuel cell body, and a fuel tank coupled to the fuel pump.

BRIEF DESCRIPTION OF THE DRAWINGS

The accompanying drawings are comprised to provide a further understanding, and are incorporated in and constitute a part of this specification. The drawings illustrate certain embodiments and, together with the description, serve to explain the principles of the disclosure.

DETAILED DESCRIPTION OF CERTAIN EMBODIMENTS

Hereinafter, preferred embodiments will be described in detail with reference to the accompanying drawings to be easily carried out by a person having ordinary skill in the art.

Figure 1:
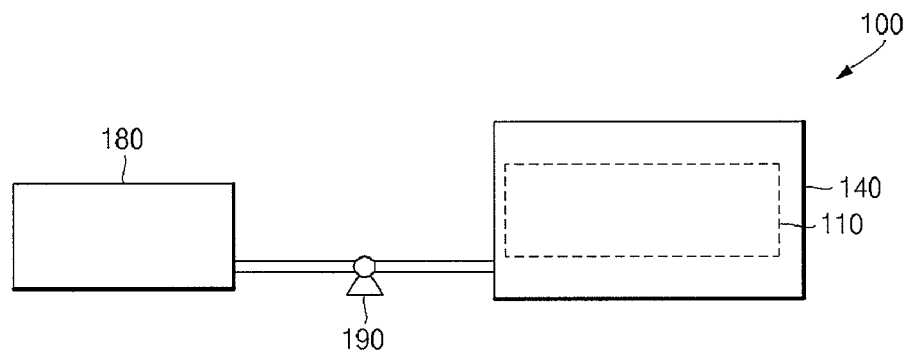
FIG. 1 is a diagram schematically illustrating an embodiment of a structure of a fuel cell system.
Figure 2:
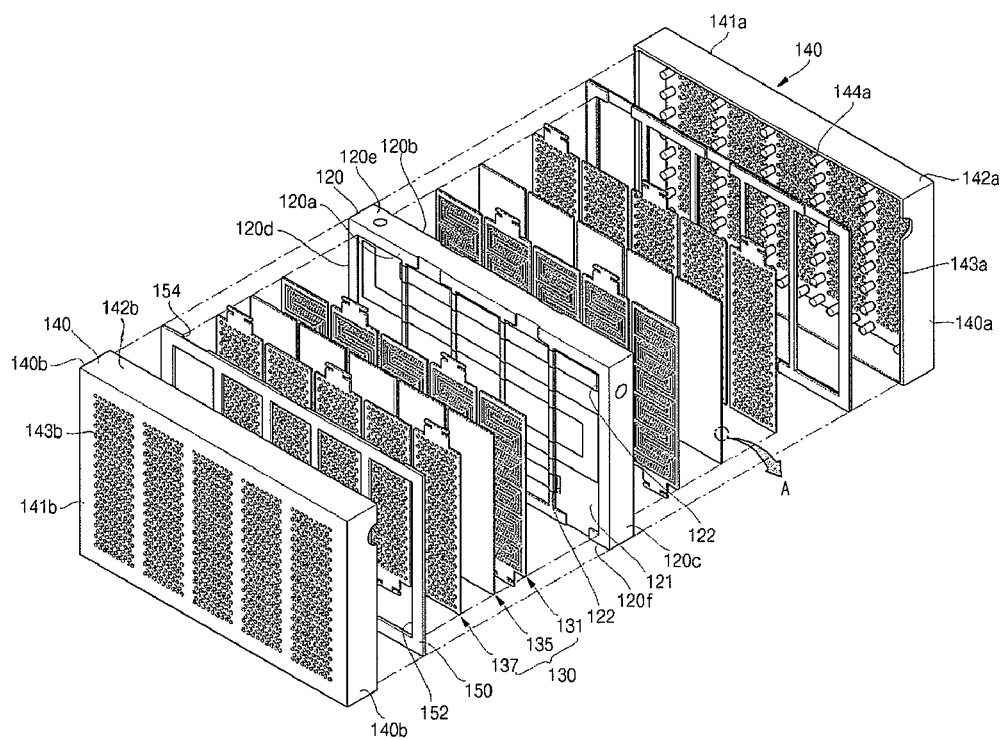
FIG. 2 is an exploded perspective view illustrating an embodiment of a fuel cell body of a fuel cell system.
Figure 3:
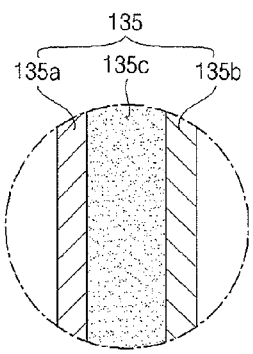
FIG. 3 is a detailed cross-sectional view of portion A of FIG. 2.
Figure 4A:
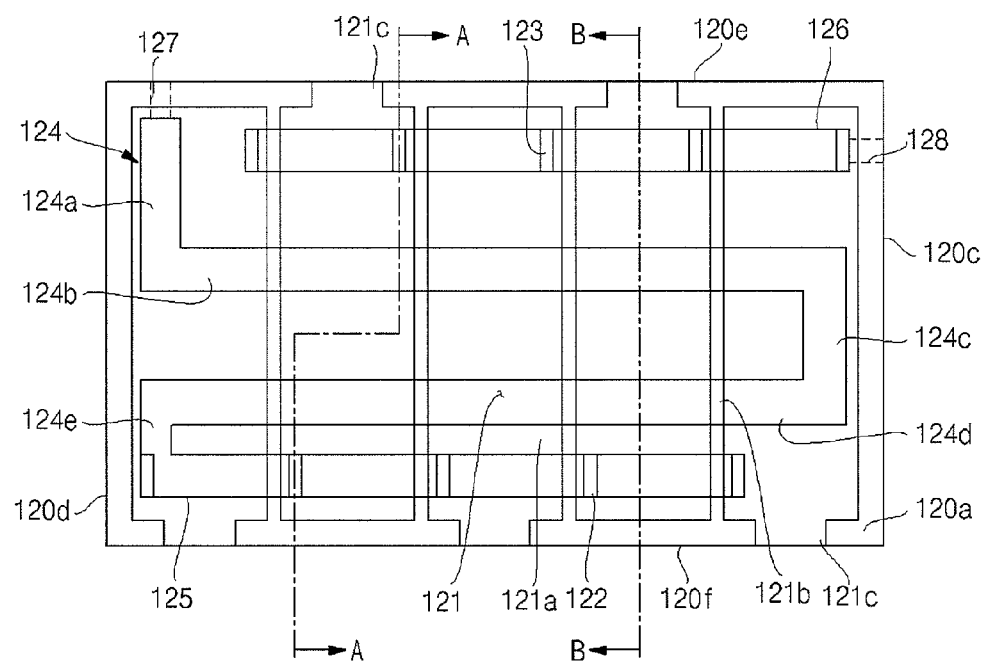
FIG. 4A is a front view illustrating the middle plate of a fuel cell body of FIG. 2.
Figure 4B:
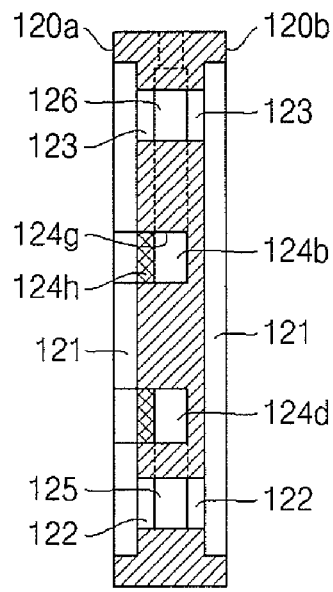
FIG. 4B is a sectional view taken along section A-A of FIG. 2.
Figure 4C:
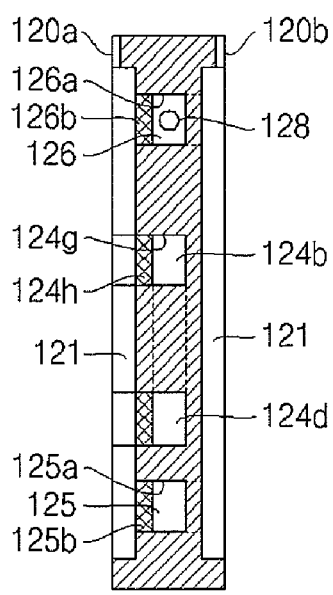
FIG. 4C is a sectional view taken along section B-B of FIG. 2.
Figure 4D:
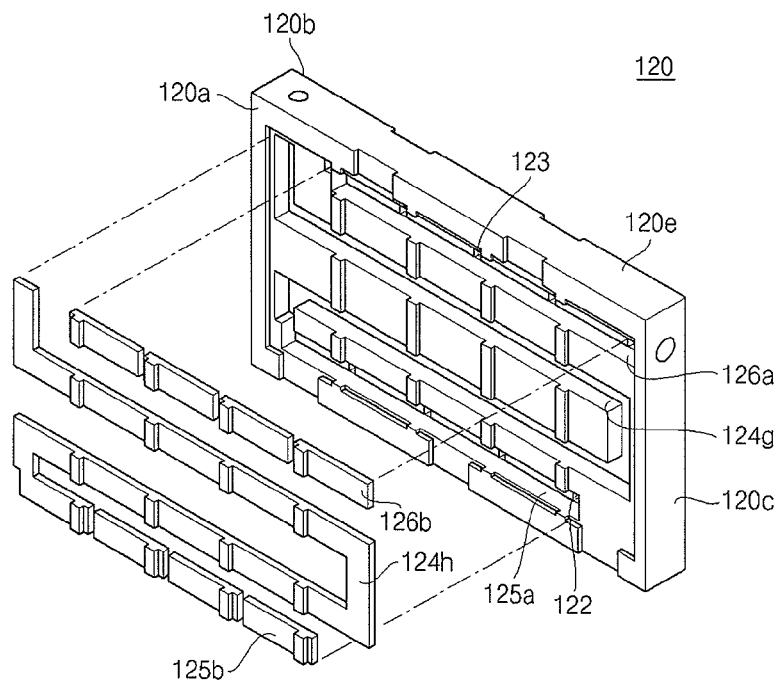
FIG. 4D is an exploded perspective view illustrating the middle plate of FIG. 4A.
Figure 5:
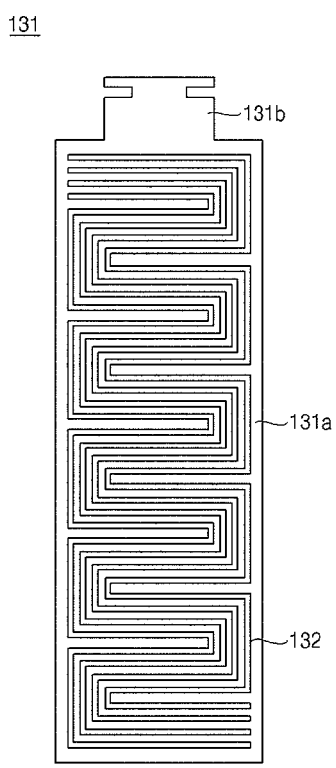
FIG. 5 is a front view illustrating an anode part of a fuel cell body of FIG. 2.
Figure 6:
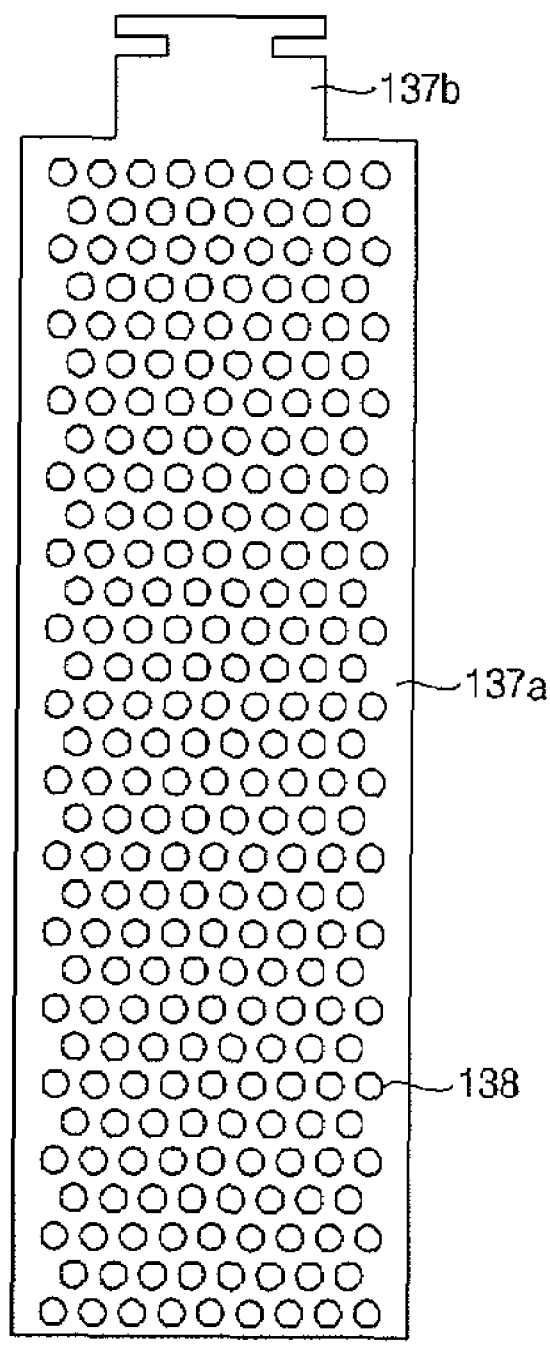
FIG. 6 is a front view illustrating a cathode part of a fuel cell body of FIG. 2.

FIG. 1 is a diagram illustrating a structure of an embodiment of a fuel cell system 100. FIG. 2 is an exploded perspective view illustrating an embodiment of a fuel cell body of a fuel cell system. FIG. 3 is a detailed cross-sectional view of portion A of FIG. 2. FIG. 4A is a front view illustrating a middle plate of the fuel cell body of FIG. 2. FIG. 4B is a sectional view taken along section A-A of FIG. 2. FIG. 4C is a sectional view taken along section B-B of FIG. 2. FIG. 4D is an exploded perspective view illustrating the middle plate of FIG. 4A. FIG. 5 is a front view illustrating an anode part of the fuel cell body of FIG. 2. FIG. 6 is a front view illustrating a cathode part of the fuel cell body of FIG. 2.

Referring to FIG. 1 to FIG. 6, the fuel cell system 100 according to the illustrated embodiment comprises a fuel cell body 110. The fuel cell system 100 may further comprise a case 140 surrounding the entire fuel cell body 110. Additionally, the fuel cell system 100 may further comprise a fuel tank 180 and a fuel pump 190.

The fuel cell system 100 may be configured as a direct methanol fuel cell (DMFC), to which is directly supplied an alcohol-based fuel, such as methanol, ethanol, and the like, and air, and which generates electricity by an oxidation reaction of the hydrogen contained in the fuel and a reduction reaction of oxygen contained in the air.

Furthermore, the fuel cell system 100 is configured as a semi-passive type that is supplied with fuel by a fuel pump and a fuel tank, and supplied with air in the atmosphere by natural diffusion or convection. The fuel cell system 100 is formed in a flat type stack in which a plurality of the unit cells for generating electricity is arranged on a plane.

The fuel cell system 100 may pre-heat the fuel in the fuel cell body, thereby reducing the temperature differences of the fuel provided to each unit cell.

Referring to FIG. 2, the fuel cell body 110 comprises a middle plate 120, and a plurality of unit cells 130 arranged in the middle plate 120 on a plane. The unit cells 130 may be arranged symmetrically, centered on the middle plate 120. The fuel is provided to the fuel cell body 110 via the middle plate 120, and the air is provided to the fuel cell body 110 by the convection. The fuel cell body 110 generates the electrical energy through the chemical reaction of the fuel and air provided.

As best seen in FIG. 4A, the middle plate 120 comprises a plurality of unit sections 121, inlet openings 122, outlet openings 123, a middle passage 124, a supply passage 125, a discharge passage 126, a supply opening 127, and a discharge opening 128. The middle plate 120 functions as a separator for supporting unit cell 130 and electrically separating the arranged unit cell 130. Further, the middle plate 120 supplies the fuel provided from outside to the unit cell 130. The size of the middle plate 120 is determined depending on the number of unit cells 130.

The middle plate 120 is formed in an approximate plate shape. Referring to FIG. 4A, the middle plate 120 is formed in an approximate rectangular shape, which is wider than high.

The middle plate 120 comprises a first surface 120a, a second surface 120b, a third surface 120c, a fourth surface 120d, a fifth surface 120e and a sixth surface 120f. The first surface 120a and the second surface 120b are the front surface and the back surface on which the unit cell 130 is formed, respectively. The third surface 120c is the side of the middle plate 120 on which the discharge opening 128 is formed, and the fourth surface 120d is the opposite side from the third surface 120c. The fifth surface 120e is the upper edge of the middle plate 120 on which the supply opening 127 is formed, and the sixth surface 120f is the lower edge of the middle plate 120, in the orientation illustrated in FIG. 4A.

The unit sections 121 are formed on the first surface 120a and the second surface 120b of the middle plate 120 at a predetermined interval, and comprise a coupling groove 121a in a groove shape on the first surface 120a and the second surface 120b. The unit sections 121 are formed by a protrusion 121b adjacent to the coupling groove 121a, thereby distinguishing adjacent unit sections 121. In the coupling groove 121a, a terminal groove 121c from which the terminal of the unit cell 130 extends is formed on the upper portion and/or the lower portion of the middle plate 120. The unit sections 121 are formed as an active region in which a substantial reaction is generated by reaction of the fuel and air provided to the unit cell 130.

The coupling groove 121a is formed in a groove shape having a predetermined depth on the first surface 120a and the second surface 120b of the middle plate 120. The coupling groove 121a may have a space corresponding to that of the unit cell 130 for allowing the unit cell 130 to be coupled thereto. Preferably, the coupling groove 121a may have the depth about equal to or deeper than the thickness of the anode part of the unit cell 131 (FIG. 2).

The inlet openings 122 and the outlet openings 123 are formed as holes or openings on a bottom surface of the coupling groove 121a. The inlet openings 122 and the outlet openings 123 are spaced apart from each other so that the fuel provided to the unit sections 121 may be supplied to the entire unit cell 130. Preferably, the inlet openings 122 and the outlet openings 123 are diagonally positioned with respect to each other within the coupling groove 121a. Therefore, in the illustrated embodiment, the inlet opening 122 is arranged in the lower portion of the coupling groove 121a towards the side of the fourth surface 120d, and the outlet opening 123 is arranged in the upper portion of the coupling groove 121a towards the side of the third surface 120c. Unreacted fuel introduced into the inlet openings 122 passes through the unit cell 130 and is discharged via the outlet openings 123 after reaction, thereby increasing the efficient use of the fuel.

The inlet openings 122 and the outlet openings 123 are formed symmetrically on the unit sections 121 of the first surface 120a and the second surface 120b of the middle plate 120 in the illustrated embodiment.

Referring to FIG. 4B, the inlet openings 122 extend into the inside of the middle plate 120, and are coupled to the supply passage 125. The inlet openings 122 provide unreacted fuel from the fuel tank to the unit sections 121 via the supply passage 125.

Further, each inlet openings 122 has a rectangular vertical cross-section in the direction in which the inlet openings 122 extends, such that the height (the length in the vertical direction of the unit section) is larger than the width (the length in the horizontal direction of the unit section), as best seen in FIG. 4A. This configuration permits a longer fuel passageway 132 to be formed in the anode part, as discussed below.

Referring to FIG. 4B, the outlet openings 123 extend into the inside of the middle plate 120, and are coupled to the discharge passage 126. The outlet openings 123 discharge the fuel which was used for the electricity generating reaction in the unit sections 121 from the coupling groove 121a to the outside. In the illustrated embodiment, the outlet openings 123 are formed in the shape corresponding to that of the inlet openings 122, with a rectangular vertical cross-section, that is higher than wide, as illustrated in FIG. 4A.

The middle passage 124 is formed in a zigzag or serpentine shape inside the region in which the unit sections 121 are formed in the first surface 120a and the second surface 120b of the middle plate 120. The middle passage 124 connects the supply opening 127 formed on the third surface 120c, and the supply passage 125 formed on the lower portion of the middle plate 120. The middle passage 124 supplies the fuel provided from the outside to the supply passage 125 via the supply opening 127.

The middle passage 124 is formed as a pipe or conduit with a vertical cross section in a quadrangle or rectangular shape. Further, the middle passage 124 may also be formed as a pipe or conduit with a vertical cross section of a circular or an elliptical shape. The middle passage 124 having an appropriate width is formed according to the thickness of the middle plate 120.

The middle passage 124 is configured to extend between the third surface 120c and the fourth surface 120d in both the vertical and the horizontal directions in the middle plate 120. To be more specific, in the embodiment illustrated in FIGS. 4B and 4D, the middle passage 124 comprises a first passage 124a extending towards the direction of the sixth surface 120f from the supply opening 127; a second passage 124b extending towards the direction of the third surface 120c from the first passage 124a; a third passage 124c extending towards the direction of the sixth surface 120f from the second passage 124b; a fourth passage 124d extending towards the direction of the fourth surface 120d from the third passage 124c; and a fifth passage 124e extending towards the direction of the sixth surface 120f from the fourth passage 124d and coupled to the supply passage 125. Here, the particular description of the middle passage 124 including three passages extending in the vertical direction and two passages extending in the horizontal direction is exemplary. Those skilled in the art will understand that the number of the vertical passages and the number of the horizontal passages may be increased or decreased according to the size of the middle plate 120 and the middle passage 124. On the other hand, the middle passage 124 may comprise passages formed in diagonal, oblique, or curved directions as well as in the vertical and the horizontal directions.

Referring to FIGS. 4C and 4D, the middle passage 124 comprises a middle groove 124g in a trench shape which is formed on the first surface 120a of the middle plate 120; and a middle groove cover 124h coupled to the middle groove 124g. The middle groove 124g is processed and formed as a groove in a trench shape corresponding to the shape of the middle passage 124 on the first surface 120a. The middle groove 124g having a predetermined depth and width is formed according to a desired width and the height of the middle passage 124 for supplying fuel to the unit cells 130. The middle groove cover 124h is formed in a shape corresponding to the planar shape of the middle passage 124 on the first surface 120a. The middle groove cover 124h having an appropriate thickness is formed according to the width of the middle passage 124 and the depth of the middle groove 124g. The middle groove cover 124h may have the thickness corresponding to the difference between the depth of the middle groove 124g, and a desired width of the middle passage 124 for supplying fuel. Furthermore, in the illustrated embodiment, the front surface of the middle groove cover is generally coplanar with the first surface 120a, and is formed according to the shape of the first surface 120a. That is, a portion of the middle groove cover 124h corresponding to the coupling groove 121a is formed in the same shape as the coupling groove 121a, and a portion corresponding to the protrusion 121b is formed in the same shape as the protrusion 121a. On the other hand, the thickness of the middle groove cover 124h denotes the thickness of the portion corresponding to the coupling groove 121a.

The middle groove cover 124h is inserted into the middle groove 124g so that the front surface of the middle groove cover 124h is generally coplanar with the first surface 120a. The middle groove cover 124h is fixed to the middle groove 124g, for example, by an adhesive coated on the side surfaces thereof. The middle groove cover 124h closes the middle groove 124g, and prevents fuel, which is flowing inside the middle passage 124, from being leaked to the first surface 120a.

The supply passage 125 may extend from the fourth surface 120d to the third surface 120c while being in parallel with the first surface 120a inside of the lower portion of the middle plate 120. That is, the supply passage 125 may be connected from the inlet openings 122 on the unit sections 121 proximal to the fourth surface 120d to the inlet openings 122 on the unit sections 121 proximal to the third surface 120c. The supply passage 125 is formed such that an end thereof in the third surface 120c direction is closed and an end thereof in the fourth surface 120d direction may be coupled to the middle passage 124. Therefore, the supply passage 125 provides unreacted fuel from the middle passage 124 to the lower portion of the coupling groove 121a via the inlet openings 124.

The vertical cross section of the supply passage 125 is formed in the shape corresponding to that of middle passage 124, for example as a pipe or conduit with a circular or a quadrangular cross section.

The supply passage 125 may be formed by the identical method as that for forming the middle passage 124 as shown in FIGS. 4C and 4D. That is, the supply passage 125 comprises a supply groove 125a in a trench shape that is formed on the first surface 120a of the middle plate 120 and a supply groove cover 125b coupled to the supply groove 125a. The supply groove 125a is processed and formed as a groove in a trench shape corresponding to the shape of the supply passage 125 on the first surface 120a. The supply groove 125a having a predetermined depth and width is formed according to a desired width and the height of the supply passage 125 for supplying the fuel. The surface of the supply groove cover 125b is formed generally coplanar with the supply passage 125 on the first surface 120a. The supply groove cover 125b may be divided into a plurality separate portions unlike the middle groove cover 124h. That is, since the supply passage 125 is coupled to the inlet openings 122, the supply groove cover 125b covers the portions of supply groove 125a except for the portions corresponding to the inlet openings 122. The supply groove cover 125b having an appropriate thickness is formed according to the width of the supply passage 125 and the depth of the supply groove 125a. The supply groove cover 125b may have a thickness corresponding to the difference between the depth of the supply groove 125a and a desired width of the supply passage 125 for supplying the fuel. The supply groove cover 125b may have the same as the middle groove cover 124h. Further, in the supply groove cover 125b, the front surface is generally coplanar to the first surface 120a and is formed to match the shape of the first surface 120a. That is, in the supply groove cover 125b, the portion corresponding to the coupling groove 121a has the same shape as the coupling groove 121a, and the portion corresponding to the protrusion 121b has the same shape as the protrusion 121b. On the other hand, the thickness of the supply groove cover 125b denotes the thickness of the portion corresponding to the coupling groove 121a.

The supply groove cover 125b is inserted into the supply groove 125a so that the front surface of the supply groove cover 125b is generally coplanar with the first surface 120a. The supply groove cover 125b is fixed to the supply groove 125a, for example, by a adhesive coated on the side surfaces thereof. Here, the supply groove cover 125b is divided into a plurality of portions, and is coupled to the supply groove 125a so that the inlet openings 122 may be formed in each unit section 121. The supply groove cover 125b closes the supply groove 125a, and prevents the fuel flowing in the supply passage 125 from leaking to the first surface 120a, except at the inlet openings 122.

On the other hand, in the middle plate 120, the inlet openings 122 formed in the unit section 121 of the second surface 120b are formed as holes or openings penetrating from the bottom side of the supply groove 125a to the second surface 120b. The inlet openings 122 formed in the second surface 120b have shapes which are identical to that of the inlet openings 122 in the first surface 120a in the illustrated embodiment.

The discharge passage 126 may extend from the fourth surface 120d to the third surface 120c and in parallel with the first surface 120a inside the upper portion of the middle plate 120. That is, the discharge passage 126 may be connected from the outlet openings 123 on the unit section 121 proximal to the fourth surface 120d to the outlet openings 123 on the unit sections 121 proximal to the third surface 120c. Further, the discharge passage 126 is formed such that the end of the discharge passage 126 proximal to the third surface 120c direction is coupled to the discharge opening 128, and the end of the discharge passage 126 proximal to fourth surface 120d direction is closed. Therefore, the discharge passage 126 discharges the reaction fuel from each unit cell 130 to the outside via the discharge opening 128.

The vertical cross-sectional shape of the discharge passage 126 corresponds to the vertical cross-sectional shape of the middle passage 124. The discharge passage 126 is formed as pipe or conduit with a vertical cross section of a circle or a quadrangle.

The discharge passage 126 may be formed by the same method as described above for the supply passage 125. As shown in FIG. 4C, the discharge passage 126 comprises a discharge groove 126a in a trench shape that is formed on the first surface 120a of the middle plate 120 and a discharge groove cover 126b coupled to the discharge groove 126a. The discharge groove 126a is processed and formed as a groove in a trench shape corresponding to the shape of the discharge passage 126 on the first surface 120a. The discharge groove 126a having a predetermined depth and width is formed according to a desired width and the height of the discharge passage 126 for discharging fuel. The surface of discharge groove cover 126b is generally coplanar with the first surface 120a. The discharge groove cover 126b may be divided into a plurality of portions unlike the middle groove cover 124h. That is, the discharge passage 126 is coupled to the outlet openings 123, the discharge groove cover 126b covers the remaining portions of the discharge groove 126a except for the portions corresponding to the outlet openings 123. The discharge groove cover 126b having an appropriate thickness is formed according to the width of the discharge passage 126 and the depth of the discharge groove 126a. The discharge groove cover 126b may have the thickness corresponding to the difference between the depth of the discharge groove cover 126b, and a desired width of the discharge passage 126 for the fuel discharge. The discharge groove cover 124h may have same thickness as that of the middle groove cover 124h. Further, in the discharge groove cover 126b, the generally coplanar front surface is formed according to the shape of the first surface 120a. That is, in the discharge groove cover 126b, the portion corresponding to the coupling groove 121a has the same shape as the coupling groove 121a, and the portion corresponding to the protrusion 121b has the same shape as the protrusion 121b. On the other hand, the thickness of the discharge groove cover 126b denotes the thickness of the portion corresponding to the coupling groove 121a.

The discharge groove cover 126b is inserted into the discharge groove 126a so that the front surface is generally coplanar with the first surface 120a. The discharge groove cover 126b is fixed to the discharge groove 126a, for example, by an adhesive coated on the side surfaces thereof. Here, the discharge groove cover 126b is divided into a plurality portions and is coupled to the discharge groove 126a so that the outlet openings 123 may be formed in each unit section 121. The discharge groove cover 126b closes the discharge groove 126a, and prevents fuel flowing in the discharge passage 126 from leaking to the first surface 120a except at the outlet openings 123.

On the other hand, in the middle plate 120, the outlet openings 123 formed in the unit section 121 in the second surface 120b is formed as a hole of opening penetrating from the bottom side of the discharge groove 126a to the second surface 120b. The outlet opening 123 formed in the second surface 120b has an identical shape to that of the outlet openings 123 formed in the first surface 120a in the illustrated embodiment.

The supply opening 127 is formed on a side of the fifth surface 120e of the middle plate 120 and is coupled to the middle passage 124. The supply opening 127 is coupled to the fuel pump 190 (FIG. 1) and supplies unreacted fuel from the fuel pump 190 to the supply passage 125.

The supply opening 127 may penetrate through the middle plate 120, and be coupled to the middle passage 124. The supply opening 127 may be formed as a hole in the middle plate 120 unlike the middle passage 124, which comprises a groove and a cover, and an external pipe or conduit (not shown) tightly fastened thereto. On the other hand, the supply opening 127 may be formed by a groove formed in the middle plate 120, and a cover covering the groove, in a fashion similar to the middle passage 124.

The discharge opening 128 is formed on an upper portion of the third surface 120c of the middle plate 120, coupled to the discharge passage 126. The discharge opening 128 may be integrally formed with the discharge passage 126. The discharge opening 128 is coupled to an additional mixing tank (not shown), and discharges the fuel which was used for reaction in the unit cell 130.

The discharge opening 128 may penetrate through the middle plate 120 and be coupled to the discharge passage 126. The discharge opening 128 may be formed as a hole or opening in a side surface of the middle plate 120 unlike the middle passage 124, and an external pipe or conduit (not shown) may be tightly fastened thereto. On the other hand, the discharge opening 128 may be formed by a groove formed in the middle plate 124, and a cover covering the groove in a fashion similar to the middle passage 124.

Referring to FIG. 2, the unit cell 130 comprises an anode part 131 arranged over each unit section 121 of the first surface 120a and the second surface 120b, respectively; a membrane-electrode assembly (hereinafter, referred to as "MEA") 135 contacting the anode part 131; and a cathode part 137 contacting the MEA 135. The unit cell 130 generates the electrical energy by reaction of the fuel and air provided thereto.

Referring to FIGS. 2 and 5, the anode part 131 comprises an anode collecting plate 131a and an anode electrode terminal 131b that are closely arranged to the coupling groove 121a. The anode part 131 serves as a guide for allowing the unreacted fuel to flow into the coupling groove 121a. Further, the anode part 131 serves as a conductor for moving electrons separated from hydrogen contained in the fuel to the cathode part 130 of an electricity generating unit by the first electrode layer 135a (FIG. 3).

The anode collecting plate 131a is formed as a plate, and may comprise one or more metals such as gold, silver, and copper having an excellent electrical conductivity, or by plating one or more metals such as gold, silver, and copper on the surface of another metal. The anode collecting plate 131a comprises a fuel passageway 132 for providing fuel. The anode collecting plate 131a is closely coupled to the coupling groove 121a of the unit sections 121 on both sides of the middle plate 120. Further, the anode collecting plate 131a is closely arranged to the first electrode layer 135a of MEA 135.

The fuel passageway 132 penetrates through the plate of the anode collecting plate 131a within a predetermined width, with a plurality of flow passages formed in a zigzag, meandering, or serpentine shape spaced at a predetermined interval. That is, in the fuel passageway 132, a plurality of flow passages are arranged in parallel at an arbitrary interval each other, and they are formed in a zigzag, meandering, or serpentine shape. It is natural that the fuel passageway 132 may be formed in various kinds of shapes. A first end of the fuel passageway 132 is positioned at the region in which the inlet openings 122 are formed and a second end is positioned at the region in which the outlet openings 123 are formed. That is, the fuel passageway 132 is formed as multiple passages for coupling the inlet openings 122 and the outlet openings 123. Therefore, the fuel passageway 132 supplies the fuel provided through the supply passage 125 of the middle plate 120, and the inlet openings 122 to the first electrode layer 135a of MEA 135.

The anode electrode terminal 131b protrudes outside the fuel cell body 110 through and is supported by the terminal groove 121c. The anode electrode terminal 131b is coupled to the cathode part 137 of a neighboring unit cell 130 via an additional conducting line and the like.

The anode electrode terminal 131b is integrally formed with the anode collecting plate 131a, and may extended through the upper portion or the lower portion of the middle plate 120. The anode electrode terminal 131b is coupled to the cathode electrode terminal 137b via an additional connection terminal (not shown).

Referring to FIG. 3, the first electrode layer 135a is formed on a first side of the MEA 135 and the second electrode layer 135b is formed on a second side of the MEA 135. The MEA 135 may be formed as a common MEA in which an electrolyte film is arranged between the first 135a and second 135b electrode layers. The first electrode layer 135a comprises an anode electrode layer that separates hydrogen contained in the fuel into electrons and hydrogen ions The electrolyte film 135c conducts the hydrogen ions to the second electrode layer 135b. And, the second electrode layer 135b may be formed by a cathode electrode layer generating water and heat by reacting the electrons and the hydrogen ions from the first electrode layer 135a with the additionally provided oxygen. Here, the MEA 135 may have the size corresponding to the size of the anode part 131, and the cathode part 137, with a common gasket (not shown) arranged around the peripheral portion thereof. The MEA 135 is arranged on the unit section 121 of the middle plate 120 so that the first electrode layer 135a may be closely arranged to the anode part 131. The MEA 135 may be formed as a general structure known in the art which is directly used in the methanol fuel cell, and a detailed explanation thereof is omitted here.

Referring to FIG. 6, the cathode part 137 comprises a cathode collecting plate 137a and a cathode electrode terminal 137b. The cathode part 137 is closely arranged to the second electrode layer 135b of the MEA 135, providing air to the MEA 135. The cathode part 137 has a size corresponding to the anode part 131 and/or the MEA 135. Furthermore, since the cathode part 137 is coupled to the anode part 131 of a neighboring unit cell 130 on the same plane of the middle plate 120, it serves as a conductor for receiving electrons.

The cathode collecting plate 137a comprises a metal plate having a desired electrical conductivity, and comprises an air passageway 138 that allows air to be distributed therethrough. The cathode collecting plate 137a may comprise one or more metals such as gold, silver, and copper having excellent electrical conductivity, or comprise a coating of one or more metals such as gold, silver, and copper on the surface of another metal.

The air passageway 138 is formed as one or more circular or a polygonal holes or openings that penetrates through the plate of the cathode collecting plate 137a for efficient distribution and supply of air, while maintaining the hardness and physical integrity of the cathode collecting plate.

The cathode electrode terminal 137b is integrally formed with the cathode collecting plate 137a, and may extend through the upper portion or the lower portion of the middle plate 120. The cathode electrode terminal 137b is coupled to the anode electrode terminal 131b via an additional connection terminal.

As shown in FIG. 2, the case 140 comprises a first case 140a and a second case 140b, and is formed as an approximate box shape. The case 140 comprises air holes 143a, 143b and support protrusions 144a (the support protrusion of the second case are not shown). Furthermore, the case 140 may comprise a support plate 150. A fuel cell body 110 is accommodated in the inside of the case 140. The first case 140a and the second case 140b are formed symmetrically in the illustrated embodiment.

The first case 140a and the second case 140b are each formed in the shape of a hollow box with one open side. The first case 140a is coupled with the second case 140b to form a space therein, which receives the fuel cell body 110. At this time, a first flat plate 141a of the first case 140a and a second flat plate 141b of the second case 140b are each opposite to the fuel cell body 110 received therein.

The air holes 143a and 143b are formed on the first flat plate 141a of the first case 140a and the second flat plate 141b of the second case 140b, respectively. The air holes 143a and 143b are formed on a region in the first flat plate 141a and the second flat plate 141b that corresponds to a region on which the unit cells 130 is positioned when the fuel cell body 110 is received therein. The air holes 143a and 143b allow air in the atmosphere to enter the inside of the case 140 to supply the unit cells 130 therewith. The air holes 143a and 143b penetrate the first flat plate 141a and the second flat plate 141b, respectively, and may be formed in any suitable shape, such as circles, rectangles, hexagons, and the like. In the illustrated embodiment, the plurality of air holes 143a and 143b comprises holes spaced apart from each other.

The support protrusions 144a of the first case 140a comprises a bar or a hemisphere that is vertically extends from regions of the first flat plate 141a on which the air holes 143a are not formed. Furthermore, the heights of the support protrusions 144a correspond to the distance between the case 140 and the fuel cell body 110. The support protrusions 144a are formed in appropriate numbers suitable for supporting the fuel cell body 110, and thus support the fuel cell body 110. More specifically, the support protrusions 144a contact with the protrusion 121b (FIG. 4A) formed around the coupling groove 121a of the middle plate 120, thereby supporting the fuel cell body 110. Although the support protrusions 144a formed on the second case 140b are not shown in the drawing, they are formed identically with the support protrusions 144a of the first case 140a.

The support plate 150 is formed in a plate shape, and contacts with the cathode part 137. allowing the unit cell 130 to be closely attached to the middle plate 120 when the fuel cell body 110 is received in the case 140. The support plate 150 comprises an opening 152 and a terminal groove 154. The opening 152 is formed at the region corresponding to the region in which the unit cell 130 is formed, and it has the size corresponding to the size of the region in which the air passageway 138 is formed in the cathode collecting plate 173a. The terminal groove 154 is formed in a groove shape sized to correspond to the dimensions of the anode electrode terminal 131a and the cathode electrode terminal 137b on the upper portion or the lower portion of the opening 152, and thus, the anode electrode terminal 131a and the cathode electrode terminal 137b are coupled.

The fuel tank 180 is formed in a box shape including a space in which liquid fuel is stored, and the fuel providing to fuel cell body 110 is stored in the fuel tank 180. The fuel tank 180 stores ethanol or methanol of the molarity (M) which is necessary for fuel cell body 110. The fuel tank 180 provides the stored fuel which is coupled to the fuel pump 190 via a pipe or conduit to the supply passage 125 of the fuel cell body 110.

The fuel pump 190 is coupled to the fuel cell body 110 via a pipe or conduit, and is coupled to the fuel tank 180 via another pipe or conduit. Therefore, the fuel pump 190 provides the fuel stored in the fuel tank 180 to the fuel cell body 110. More specifically, the fuel pump 190 is coupled to the supply passage 125 via the supply opening 127 of the middle plate 120 in order to supply the fuel. Various kinds of pumps for transferring the liquid may be used as the fuel pump 190.

Figure 7A:
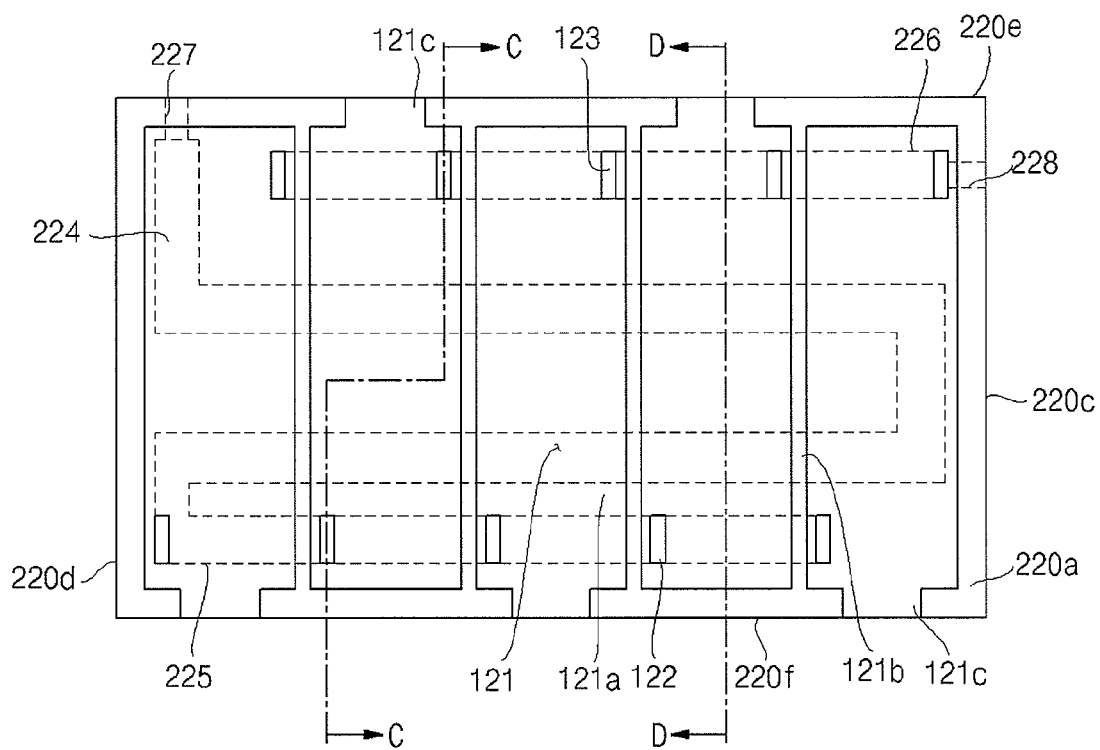
FIG. 7A is a front view illustrating a middle plate of a fuel cell system according to another embodiment.
Figure 7B:
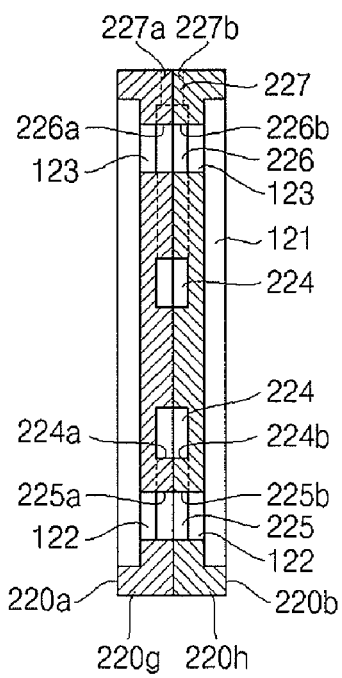
FIG. 7B is a sectional view taken along section C-C of FIG. 7A.
Figure 7C:
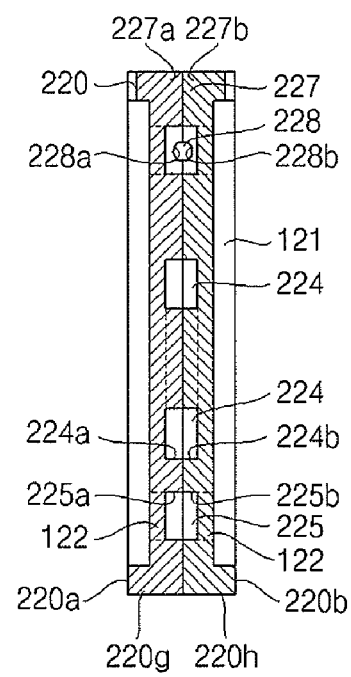
FIG. 7C is a sectional view taken along section D-D of FIG. 7A.
Figure 7D:
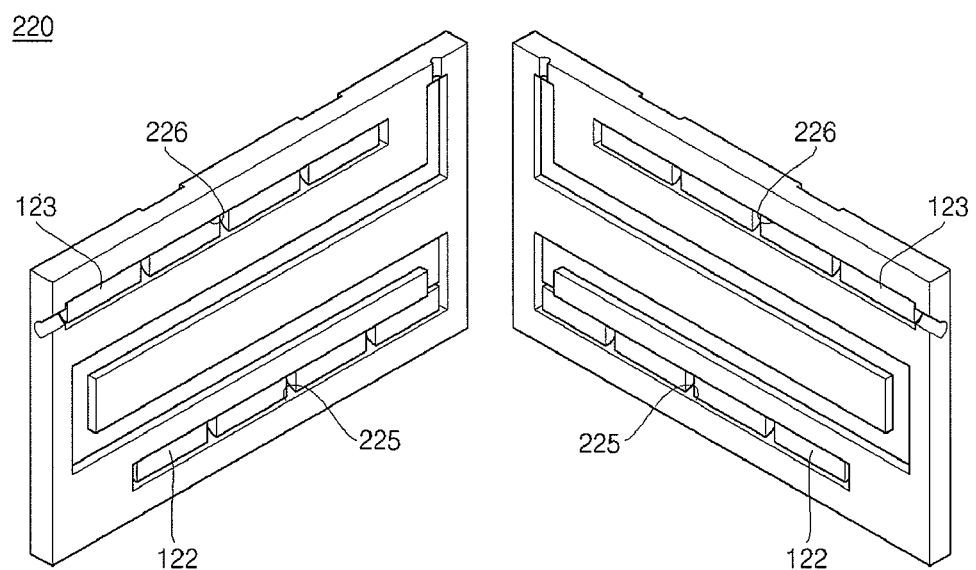
FIG. 7D is an exploded perspective view illustrating a middle plate of FIG. 7A.

The fuel cell system according to another embodiment will now be described. FIG. 7A is a front view illustrating a middle plate of a fuel cell system according to another embodiment. FIG. 7B is a sectional view along section C-C of FIG. 7A. FIG. 7C is a sectional view along section D-D of FIG. 7A. FIG. 7D is an exploded perspective view illustrating a middle plate of FIG. 7A.

The fuel cell system according to another embodiment comprises a fuel cell body having a middle plate 220. Furthermore, the fuel cell system may further comprise a case 140 for entirely covering the fuel cell body, a fuel tank 180 and a fuel pump 190. The fuel cell system according to this embodiment is different from the fuel cell system 100 according to FIG. 1-FIG. 6 discussed above in that the middle plate 220 has a different structure compared with that of the middle plate 120 of the fuel cell system 100. Therefore, the discussion will focus on the middle plate 220 of the fuel cell body, and only the drawings of the middle plate 220 will be illustrated. The parts of the fuel cell system that are same or similar to those of the fuel cell system 100 according to FIG. 1-FIG. 6 use same reference numerals, and therefore, detailed explanations thereof are omitted.

The middle plate 220 comprises a plurality of unit sections 121, inlet openings 122, outlet openings 123, a middle passage 224, a supply passage 225, a discharge passage 226, a supply opening 127, and a discharge opening 128.

Referring to FIG. 7A, the middle plate 220 is formed in an approximate rectangular shape which is wider than high. The middle plate 220 comprises a first surface 220a, a second surface 220b, a third surface 220c, a fourth surface 220d, a fifth surface 220e and a sixth surface 220f. Referring to FIGS. 7B, 7C, and 7D, the middle plate 220 is formed in an approximate plate shape, and comprises a first plate 220g and a second plate 220h. That is, the middle plate 220 is formed by securing the first plate 220g and the second plate 220h which are arranged symmetrically in the illustrated embodiment.

The unit sections 121 are formed on the first surface 220a and the second surface 220b of the middle plate 220 at a predetermined interval, and are comprise a coupling groove 121a in a groove shape and a protrusion 121b. Further, in the coupling groove 121a, the terminal groove 121c from which the terminal of the unit cell 130 extends is formed on the upper portion or the lower portion of the middle plate 220.

The inlet openings 122 and the outlet openings 123 comprise holes or openings on the bottom of the coupling groove 121a. Further, the inlet openings 122 extend into the middle plate 220, and are coupled to the supply passage 225. The inlet openings 122 provide unreacted fuel provided from the fuel tank 180 to the coupling groove 121a of the unit section 121 via the supply passage 225. The inlet openings 123 extend into the middle plate 220, and are coupled to the discharge passage 226. The outlet openings 123 discharge fuel that is used for the electricity generating reaction in the unit section 121 out of the coupling groove 121a.

The middle passage 224 is formed in a zigzag or serpentine shape inside of the region in which the unit section 121 is formed between the first surface 220a and the second surface 220b of the middle plate 220. Furthermore, the middle passage 224 may pass vertically and horizontally between the third surface 220c and the fourth surface 220d inside of the middle plate 220. The middle passage 224 connects the supply opening 127 formed on the fifth surface 220e and the supply passage 225 formed on the lower portion of the middle plate 220.

The middle passage 224 comprises a pipe or conduit having a vertical cross section in a quadrangle shape. The entire shape of the middle passage 224 is similar to the middle passage 124 illustrated in FIG. 4A. The method for forming the middle passage 224 is different from the method for forming the middle passage 124 of FIG. 4A, however.

The middle passage 224 comprises a first groove 224a and a second groove 224b formed in a groove shape on an inner surfaces of the first plate 220g and the second plate 220h that together form the middle plate 220. Here, the inner surface denotes the surfaces of the first plate 220g and the second plate 220h that face each other. The first groove 224a is formed in the shape corresponding to the shape obtained when the middle passage 224 is cut in half with a cut parallel with the first surface 220a. Furthermore, the second groove 224b is formed in the shape to symmetrical to the first groove 224a. Therefore, the middle passage 224 is formed by coupling the first groove 224a and the second groove 224b when the inner surfaces of the first plate 224g and the second plate 224h contact and are secured to each other.

The supply passage 225 may extend from the fourth surface 220d to the third surface 220c in parallel with the first surface 220a inside the lower portion of the middle plate 220.

The entire shape of the supply passage 225 may be similar to that of the supply passage 125 illustrated in FIG. 4A. The supply passage 225 is different from the supply passage 125 of FIG. 4A in the method for forming the supply passage 225 in the middle plate 220.

Referring to FIGS. 7A and 7B, the supply passage 225 comprises a third groove 225a and a fourth groove 225b formed in a groove shape on the inner surfaces of the first plate 224g the second plate 224h that together form the middle plate 220. Here, the inner surface denotes the surfaces of the first plate 220g and the second plate 220h that face each other. The third groove 225a is formed in the shape corresponding to the shape obtained when the supply passage 225 is cut in half with a cut parallel with the first surface 220a. Further, the fourth groove 225b has a shape corresponding to the third groove 225a. Therefore, the supply passage 225 is formed by coupling the third groove 225a and the fourth groove 225b when the inner surfaces of the first plate 220g and the second plate 220h contact with and are secured to each other. The inlet openings 122 may penetrate from the third groove 225a and the fourth groove 225b to the first plate 224g and the second plate 224h as shown in FIG. 7D.

The discharge passage 226 may extend from the third surface 220c to the fourth surface 220d direction and parallel with the first surface 220a inside the lower portion of the middle plate 220. The entire shape of the discharge passage 226 may be similar to that of the discharge passage 126 illustrated in FIG. 4A. The method for forming the discharge passage 226 is different from the method for forming the discharge passage 126 of FIG. 4A.

Referring to FIGS. 7A and 7B, the discharge passage 225 comprises a fifth groove 226a and a sixth groove 226b formed in a groove shape on the inner surfaces of the first plate 220g and the second plate 220h that together form the middle plate 220. Here, the inner surface denotes the surfaces of the first plate 224g and the second plate 224h that face each other. The fifth groove 226a is formed in a shape corresponding to the shape obtained when the discharge passage 226 is cut in half with a cut parallel with the first surface 220a. The sixth groove 226b has a shape corresponding to the fifth groove 226a. Therefore, the discharge passage 226 is formed by coupling the fifth groove 226a and the sixth groove 226b when the inner surfaces of the first plate 224g and the second plate 224h contact with and are secured to each other. Here, the outlet openings 123 may penetrate from the fifth groove 226a and the sixth groove 226b to the first plate 224g and the second plate 224h as shown in FIG. 7D.

The supply opening 227 is formed on a side of the fifth surface 220e of the middle plate 220, and is coupled to the middle passage 224. The shape of the supply opening 227 is similar to the shape of the supply opening 127 illustrated in FIG. 4A. The method for forming the supply opening 227 is different from the method for forming the supply opening 127 of FIG. 4A.

The supply opening 227 comprises a seventh groove 227a and an eighth groove 227b formed in a groove shape on the inner surfaces of the first plate 220g and the second plate 220h for forming the middle plate 220 as shown in FIG. 7B. Here, the inner surface denotes the surfaces of the first plate 220g and the second plate 220h that face each other. The seventh groove 227a is formed in a shape corresponding to the shape obtained when the supply opening 227 is cut in half with a cut parallel with the first surface 220a. Furthermore, the eighth groove 227b has a shape corresponding to the shape of the seventh groove 227a. Therefore, the supply opening 227 is formed by coupling the seventh groove 227a and the eighth groove 227b when the inner surfaces of the first plate 220g and the second plate 220h contact with and are secured to each other.

The discharge opening 228 is formed on a side of the third surface 220c of the middle plate 220, and is coupled to the discharge passage 226. The entire shape of the discharge opening 228 is similar to the shape of the discharge opening 128 illustrated in FIG. 4A. The method for forming the discharge opening 228 is different from the method for forming the discharge opening 128 of FIG. 4A, however.

Referring to FIG. 7C, the discharge opening 228 comprises a ninth groove 228a and a tenth groove 228b formed in a groove shape on the inner surfaces of the first plate 220g and the second plate 220h that together form the middle plate 220. Here, the inner surface denotes the surfaces of the first plate 220g and the second plate 220h that face each other. The ninth groove 228a has a shape corresponding to the shape obtained when the discharge opening 228 is cut in half with a cut parallel with the first surface 220a. Furthermore, the tenth groove 228b has a shape corresponding to the ninth groove 228a. Therefore, the discharge opening 228 is formed by coupling the ninth groove 228a and the tenth groove 228b when the inner surfaces of the first plate 220g and the second plate 220h contact with and are secured to each other.

Figure 8A:
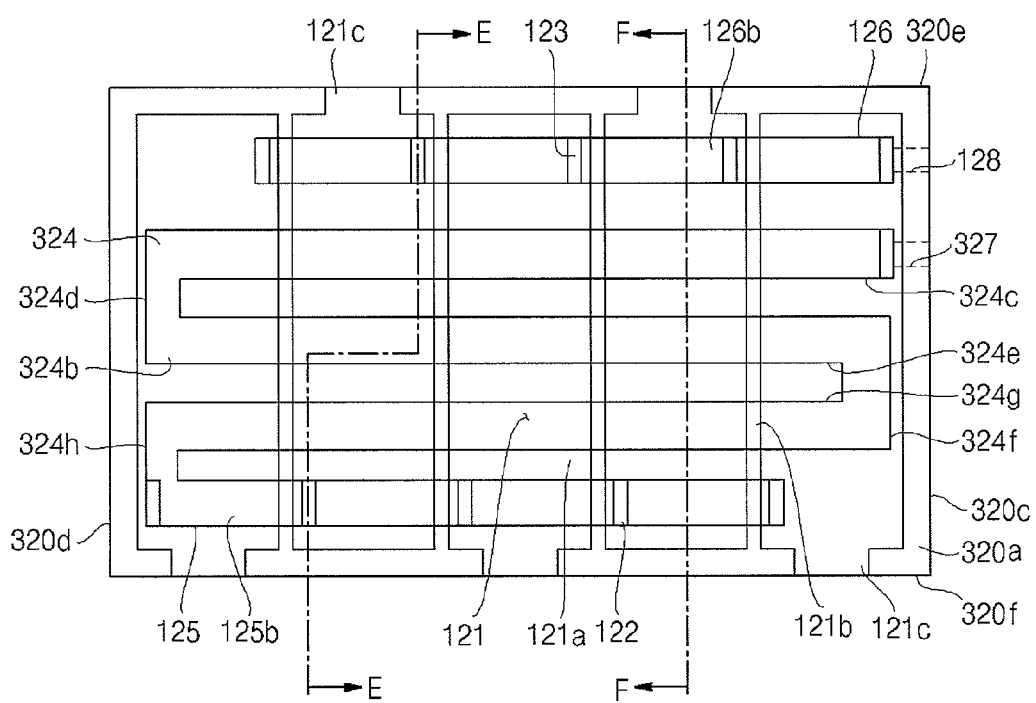
FIG. 8A is a front view illustrating a middle plate of a fuel cell system according to still another embodiment.
Figure 8B:
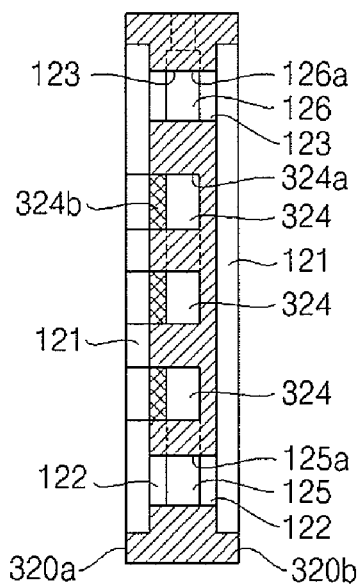
FIG. 8B is a sectional view taken along section E-E of FIG. 8A.
Figure 8C:
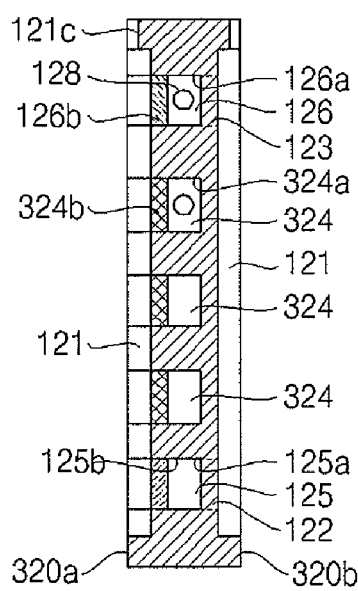
FIG. 8C is a sectional view taken along section F-F of FIG. 8A.

Next, the fuel cell system according to still another embodiment will be explained. FIG. 8A is a front view illustrating a middle plate of a fuel cell system according to still another embodiment. FIG. 8B is a sectional view along section E-E of FIG. 8A. FIG. 8C is a sectional view along section F-F of FIG. 8A.

The fuel cell system according this embodiment comprises a fuel cell body including a middle plate 320 and a plurality of unit cells 130. The fuel cell system may further comprise a case 140 surrounding the entire fuel cell body, a fuel tank 180 and a fuel pump 190. The fuel cell system is different from the fuel cell system 100 according to FIG. 1-FIG. 6 and described above in that the middle plate has the different structure compared with that of the middle plate 120 of the fuel cell system 100. Therefore, below, in connection with the fuel cell system according to present embodiment, the description will focus on the middle plate 320 of the fuel cell body, and only the drawings of the middle plate 320 will be illustrated. Furthermore, the parts of the fuel cell system which are same or similar to those of the fuel cell system 100 according to FIG. 1-FIG. 6 use the same reference numerals, and detailed descriptions explanations thereof are omitted.

The middle plate 320 comprises a plurality of unit sections 121, inlet openings 122, outlet openings 123, a middle passage 324, a supply passage 125, a discharge passage 126, a supply opening 327 and a discharge opening 128. The middle plate 320 is formed such that some parts of the middle passage 324 may be arranged adjacent to the discharge passage 126 while being parallel with discharge passage 126. Therefore, the fuel flowing in the middle passage 324 may be heated by the fuel flowing through the discharge passage 126.

The middle plate 320 is formed in an approximate plate shape. Referring to FIG. 8A, the middle plate 320 is formed in an approximate rectangular shape that is wider than high. The middle plate 320 comprises a first surface 320a, a second surface 320b, a third surface 320c, a fourth surface 320d, a fifth surface 320e and a sixth surface 320f. The first surface 320a, and the second surface 320b denote the front surface and the back surface, respectively. The third surface 320c denotes a side of the middle plate 320 in which the supply opening 327 and the discharge opening 128 are formed, and the fourth surface 320d denotes a surface opposite the third surface 320c. The fifth surface 320e denotes the upper surface of the middle plate 320, and the sixth surface 320f denotes the lower surface of the middle plate 320.

The unit sections 121 are formed on the first surface 320a and the second surface 320b of the middle plate 320 at a predetermined interval, and are comprise a coupling groove 121a in a groove shape on the first surface 320a and the second surface 320b. A protrusion 121b surrounds the coupling groove 121a, distinguishing adjacent unit sections 121. Furthermore, in the coupling groove 121a, a terminal groove 121c from which the terminal of the unit cell 130 extends is formed on the upper portion or the lower portion of the middle plate 320.

The inlet openings 122 and the outlet openings 123 are formed as holes or openings on the bottom of the coupling groove 121a. The inlet openings 122 and the outlet openings 123 are spaced apart from each other so that the fuel provided to the unit sections 121 may be supplied to the entire unit cell 130.

The middle passage 324 is formed in a zigzag or serpentine shape inside of the region in which the unit section 121 is formed, between the first surface 320a and the second surface 320b of the middle plate 320. The middle passage 324 connects the supply opening 327 formed on the third surface 320e and the supply passage 125 formed on the lower portion of the middle plate 320. The middle passage 324 provides fuel from the outside via the supply opening 327 to the supply passage 125.

The middle passage 324 is formed as a pipe or conduit with a vertical cross section in a quadrangle shape. In other embodiments, the middle passage 324 is formed as a pipe or conduit with a circular or elliptical vertical cross section. The middle passage 324 with an appropriate width is formed according to the thickness of the middle plate.

The middle passage 324 may pass vertically and horizontally between the third surface 320a and the fourth surface 320d inside the middle plate 320 and in parallel with the first surface 320a. To be more specific, the middle passage 324 is coupled to the supply opening 327 and comprises of a first passage 324c extending towards the fourth surface 320d from the third surface 320c and in parallel with the discharge passage 126; a second passage 324d extending towards the sixth surface 320f from the first passage 324c; a third passage 324e extending towards the third surface 320c from the second passage 324d; a fourth passage 324f extending towards the sixth surface 320f from the third passage 324e; a fifth passage 324g extending towards the fourth surface 320d from the fourth passage 324f; and a sixth passage 324h extending towards the sixth surface 320f from the fifth passage 324g and coupled to the supply passage 125.

In the middle passage 324, the first passage 324c coupled to the supply opening 327 is formed adjacent to the discharge passage 126 while being in parallel with the discharge passage 126. Since the fuel flowing in the discharge passage 126 is the fuel used in the electricity generating reaction, the temperature of the fuel is high. However, since the fuel flowing in the first passage 324c is the fuel provided from outside, the temperature of the fuel is relatively low. Therefore, the middle plate 320 is formed such that the first passage 324c is adjacent to the discharge passage 126, and thus the fuel flowing in the first passage 324c may absorb efficiently the heat of the fuel flowing in through the discharge passage 126.

In the illustrated embodiment, the middle passage 324 comprises three passages extending in a vertical direction and three passages extending in a horizontal direction. In the middle passage 324, since the passage coupled to the supply opening 327 is formed adjacent to the discharge passage 126 while being in parallel with the discharge passage 126, the number of the vertical passages and the number of the horizontal passages may be changed depending on the size of the middle plate 320 and the size of the discharge passage 126. On the other hand, the middle passage 324 may be formed with diagonal, oblique, or curved passages, as well as in vertical and horizontal passages.

Referring to FIGS. 8B and 8C, the middle passage 324 comprises a middle groove 324a in a trench shape which is formed on the first surface 320a; and a middle groove cover 324b coupled to the upper portion of the middle groove 324a to seal the middle groove 324a from the first surface 320a. The middle groove 324a is formed as a groove of a trench shape corresponding to the shape of the middle passage 324 on the first surface 320a. The middle groove cover 324b is formed as a shape corresponding to the plane shape of the middle groove 324a. The middle groove cover 324b has a thickness corresponding to the dimension of the middle passage 324 desired for supplying fuel in conjunction with the depth of the middle groove 324a. The thickness of the middle groove cover 324b denotes the thickness of the portion corresponding to the coupling groove 121a. Furthermore, in the middle groove cover 324b, the front surface is formed according to the shape of the first surface 320a for forming a generally coplanar first surface 320a. That is, in the middle groove cover 324b, the parts corresponding to the coupling groove 121a and the protrusion 121b are formed in the same shape as that of the coupling groove 121a, and the protrusion 121b. The middle groove cover 324b is inserted into the middle groove 324a so that the front surface may be parallel with the first surface 320a. The middle groove cover 324b is fixed to the middle groove 324a, for example by an adhesive coated on the side surfaces. The middle groove cover 324b seals the middle groove 324a, and prevents fuel flowing in the middle passage 324 from leaking to the first surface 320a.

The supply passage 125 may extend from the fourth surface 320d towards the third surface 320c and in parallel with the first surface 320a inside the lower portion of the middle plate 320. That is, the supply passage 125 may extend from the inlet openings 122 formed on the unit section 121 of the fourth surface 320d to the inlet openings 122 on the unit section 121 of the third surface 320c.

The supply passage 125 may be formed by the same method used to form the middle passage 324 as shown in FIG. 8C. That is, the supply passage 125 comprises of a supply groove 125a in a trench shape that is formed on the first surface 320a of the middle plate 320; and a supply groove cover 125b coupled to the upper portion of the supply groove 125a. The supply groove 125a is formed as a groove of a trench shape corresponding to the shape of the supply passage 125 on the first surface 320a. The supply groove cover 125b is formed in a shape corresponding to the plane shape of the supply groove 125a. Only, the supply groove cover 125b may be divided into a plurality of portions unlike the middle groove cover 324b, which is a single unit in the illustrated embodiment. That is, since the supply passage 125 is coupled to the inlet openings 122, the supply groove cover 125b covers the all of the supply groove 125a except for the portions corresponding to the inlet openings 122. Therefore, the supply groove cover 125b closes the supply groove 125a from the first surface direction except for the regions in which the inlet openings 122 are formed.

The discharge passage 126 may extend towards the fourth surface 320d from the third surface 320c and in parallel with the first surface 320a inside the upper portion of the middle plate 320. That is, the discharge passage 126 may extend from the outlet openings 123 of the unit section 121 proximal to the third surface 320c to the outlet opening 123 on the unit section 121 proximal to the fourth surface 320d.

The discharge passage 126 may be formed by the same method used to form the middle passage 324 as shown in FIG. 8C. That is, the discharge passage 126 comprises a discharge groove 126a in a trench shape that is formed on the first surface 320a of the middle plate 320; and a discharge groove cover 126b coupled to the upper portion of the discharge groove 126a. The discharge groove cover 126b is formed as a groove of a trench shape corresponding to the shape of the discharge passage 126 on the first surface 130a. The discharge groove cover 126b is formed as a shape corresponding to the planar shape of the discharge groove 126a. Only, the discharge groove cover 126b may be divided into a plurality of portions unlike the middle groove cover 324b. That is, since the discharge passage 126 is coupled to the outlet openings 123, the discharge groove cover 126b covers the discharge groove 126a except for the portions corresponding to the outlet opening 123. Therefore, the discharge groove cover 126b seals the discharge groove 126a from the first surface 320a direction except for the region in which the outlet openings 123 are formed.

The supply opening 327 is formed on the third surface 320c of the middle plate 320 and is coupled to the middle passage 324. The supply opening 127 may be integrally formed with the middle passage 324. The supply opening 127 is coupled to the fuel pump 190 and supplies unreacted fuel provided from the fuel pump 190 to the middle passage 324.

The supply opening 327 may penetrate through the third surface 320c of the middle plate 320, and be coupled to the middle passage 324.

The discharge opening 128 is formed on the upper portion of the third surface 320c of the middle plate 320 so that it may be coupled to the discharge passage 126. The discharge opening 128 is coupled to an additional mixing tank (not shown), and discharges the fuel which was used for reaction in the unit sections 121. The discharge opening 128 is formed above the supply opening 327 and the third surface 320c.

Figure 9:
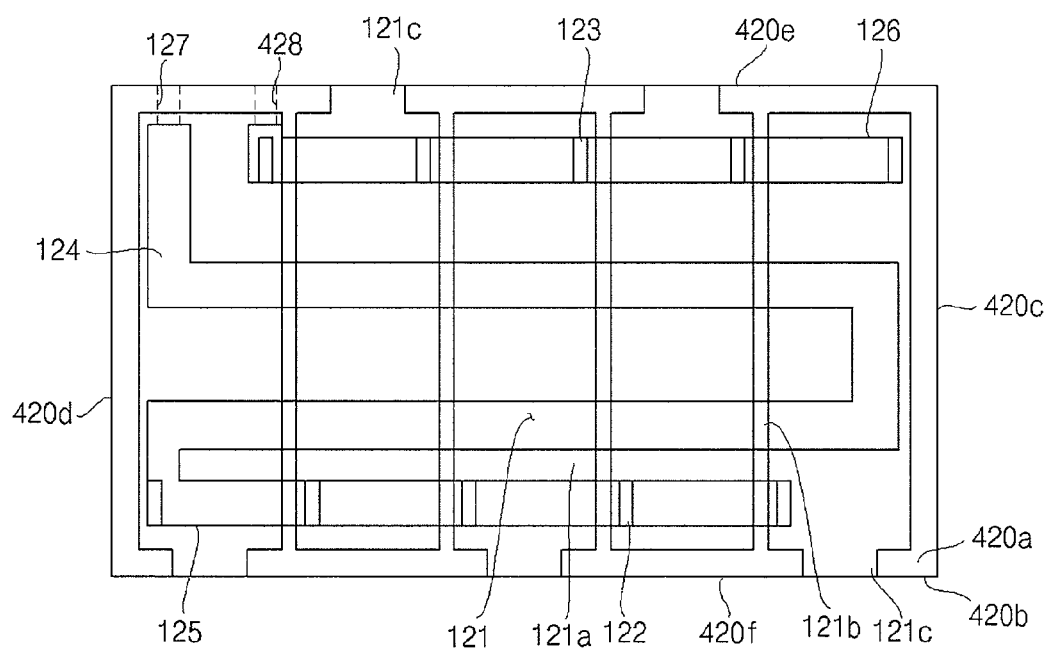
FIG. 9 is a front view illustrating a middle plate of a fuel cell system according to still another embodiment.

Next, the fuel cell system according to the still another embodiment will be explained. FIG. 9 is a front view illustrating a middle plate 420 of a fuel cell system according to still another embodiment.

The fuel cell system according to the present embodiment comprises a fuel cell body including a middle plate 420. The fuel cell system may further comprise a plurality of unit cells 130 arranged on the middle plate 420, a case 140 surrounding the entire fuel cell body, a fuel tank 180, and a fuel pump 190. The fuel cell system according to the present embodiment is different from the fuel cell system 100 according to FIG. 1-FIG. 6 and described above in that the middle plate has a different structure compared with the middle plate of the fuel cell system 100. Therefore, below, in connection with the fuel cell system according the present embodiment, the explanation will focus on the middle plate 420 of the fuel cell body, and only the drawings of the middle plate 420 will be illustrated. Further, the portions of the fuel cell system which are same or similar to those of the fuel cell system 100 according to FIG. 1-FIG. 6 are denoted by using the same reference numerals, and detailed explanations thereof are omitted.

The middle plate 420 comprises a plurality of unit sections 121, inlet openings 122, outlet openings 123, a middle passage 124, a supply passage 125, a discharge passage 126, a supply opening 127, and a discharge opening 428. The middle plate 420 is formed such that the discharge opening 428 may be arranged in parallel with the supply opening 127. Therefore, the fuel cell system is formed such that the discharge opening 428 and the supply opening 127 may be arranged in parallel with the fuel pump 190 and an additional mixing tank (not shown). The supply opening 127 may receive efficiently the heat of the fuel discharged via the discharge opening 428.

The middle plate 420 is formed in an approximate plate shape. Referring to FIG. 9, the middle plate 420 is formed in an approximate rectangular shape that is wider than high. The middle plate 420 comprises a first surface 420a, a second surface 420b, a third surface 420c, a fourth surface 420d, a fifth surface 420e and a sixth surface 420f. The first surface 420a and the second surface 420b denote the front surface and the back surface on which unit cells 130 are arranged, respectively. The third surface 320c and the fourth surface 320d denote a first side and a second side of the middle plate 420, respectively. The fifth surface 420e denotes the upper surface of the middle plate 320 in which the supply opening 127 and the discharge opening 428 are formed. The sixth surface 420f denotes the lower surface of the middle plate 320.

The unit sections 121 are formed on the first surface 420a and the second surface 420b of the middle plate 420 at a predetermined interval, and comprise a coupling groove 121a in a groove shape on the first surface 420a and the second surface 420b. A protrusion 121b surrounds the coupling groove 121a, distinguishing adjacent unit sections 121. Furthermore, in the coupling groove 121a, the terminal groove 121c from which the terminal of the unit cell 130 extends is formed on the upper portion or the lower portion of the middle plate 120.

The inlet openings 122 and the outlet openings 123 are formed as holes or openings on the bottom of the coupling groove 121a. The inlet openings 122 and the outlet openings 123 are spaced apart from each other so that the fuel provided to the unit sections 121 may be supplied to the entire unit cell 130.

The middle passage 124 is formed in a zigzag or serpentine shape inside the region in which the unit sections 121 are formed between the first surface 420a and the second surface 420b of the middle plate 420. The middle passage 124 connects the supply opening 127 formed on the fifth surface 420e and the supply passage 125 formed on the lower portion of the middle plate 420.

The supply passage 125 extends from the fourth surface 420d towards the third surface 420c, in parallel with the first surface 420a inside the lower portion of the middle plate 420.

The discharge passage 126 extends from the third surface 420c towards the fourth surface 420d, in parallel with the first surface 420a inside the upper portion of the middle plate 420.

The supply opening 127 is formed on the fifth surface 420e of the middle plate 420 and is coupled to the middle passage 124.

The discharge opening 428 is formed on the fifth surface 420e of the middle plate 420 so that it may be coupled to the discharge passage 126. The discharge opening 428 is formed adjacent to the supply opening 127 on the fifth surface 420e. Furthermore, the discharge opening 428 is formed at the unit section 121 adjacent to the fourth surface 420d. The discharge opening 428 is coupled to an additional mixing tank, and discharges the fuel which was used for reaction in the unit sections 121.

Figure 10:
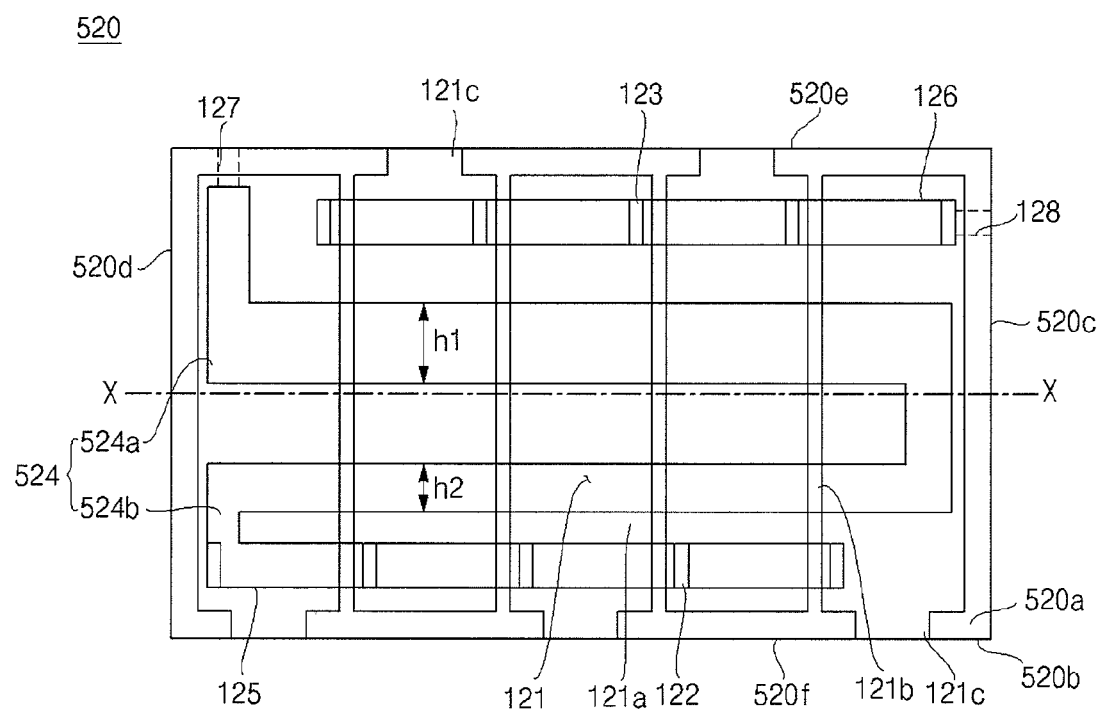
FIG. 10 is a front view illustrating a middle plate of a fuel cell system according to still another embodiment.

The fuel cell system according to the still another embodiment will be explained. FIG. 10 is a front view illustrating a middle plate 520 of a fuel cell system according to still another embodiment.

The fuel cell system according to the present embodiment comprises a fuel cell body including a middle plate 520. The fuel cell system may further comprise a plurality of unit cells 130 arranged on the middle plate 520, a case 140 surrounding the entire fuel cell body, a fuel tank 180, and a fuel pump 190.

The fuel cell system according to the present embodiment is different from the fuel cell system 100 according to FIG. 1-FIG. 6 in that the middle plate 540 has the different structure compared with that of the middle plate 120 of the fuel cell system 100. Therefore, below, in connection with the fuel cell system according to the present embodiment, explanation will focus on the middle plate 520 of the fuel cell body, and only the drawings of the middle plate 520 will be illustrated. Furthermore, the portions of the fuel cell system which are same or similar to those of the fuel cell system 100 according to FIG. 1-FIG. 6 are denoted by using the same reference numerals, and detailed explanations thereof are omitted.

The middle plate 520 comprises a plurality of unit sections 121, inlet openings 122, outlet openings 123, a middle passage 524, a supply passage 125, a discharge passage 126, a supply opening 127, and a discharge opening 128. The middle plate 520 is formed such that the size of the upper middle passage 524a formed on the upper part of the middle plate 520 may be larger than that of the lower middle passage 524b formed on the lower portion of the middle plate 520. Therefore, since the fuel provided to the middle passage 520 stays in the upper middle passage 524a, which has a relatively larger volume, for a longer time, the temperature of the fuel becomes more uniform.

The middle plate 520 is formed in an approximate plate shape. Referring to FIG. 10, the middle plate 520 is formed in an approximate rectangular shape that is wider than high. The middle plate 520 comprises a first surface 520a, a second surface 520b, a third surface 520c, a fourth surface 520d, a fifth surface 520e and a sixth surface 520f. The first surface 520a and the second surface 520b denote the front surface and the back surface on which the unit cells 130 is arranged, respectively. The third surface 520c denotes a first side of the middle plate 520 where the discharge opening 128 is formed. The fourth surface 520d denotes a second side of the middle plate 520 facing the third surface 520c. The fifth surface 520e denotes the upper portion of the middle plate 520 where the supply opening 127 is formed. The sixth surface 520f denotes the lower portion of the middle plate 520.

The unit sections 121 are formed on the first surface 520a and the second surface 520b of the middle plate 520 at a predetermined interval, and are comprise a coupling groove 121a in a groove shape on the first surface 520a and the second surface 520b. A protrusion 121b surrounding the coupling groove 121a distinguishes adjacent unit sections 121. Furthermore, in the coupling groove 121a, the terminal groove 121c from which the terminal of the unit cell 130 extends is formed on the upper portion or the lower portion of the middle plate 120.

The inlet openings 122 and the outlet openings 123 are formed as holes or openings on the bottom of the coupling groove 121a. The inlet openings 122 and the outlet openings 123 are spaced apart from each other so that the fuel provided to the unit sections 121 may be supplied to the entire unit cell 130.

The middle passage 524 is formed in a zigzag or serpentine shape inside the region in which the unit section 121 is formed between the first surface 520a and the second surface 520b of the middle plate 520. The middle passage 524 connects the supply opening 127 and the supply passage 125.

The middle passage 524 comprises an upper middle passage 524a, a lower middle passage 524b, and a plurality of vertical middle passages 524c, 524d and 524e. The upper middle passage 524a is formed in the horizontal direction on the upper portion of the middle plate 520 above the line X-X. Further, the lower middle passage 524b is formed in the horizontal direction on the lower portion below the line X-X.

The line X-X divides the middle plate 520 into the upper portion and the lower portion, and is an imaginary line generally at the vertical center of the middle plate 520. Furthermore, in connection with the middle passage 524, one upper middle passage 524a, and one lower middle passage 524b are formed in the drawings, but a plurality of passages may be formed depending on the size of the middle plate and the size of the middle passage.

The height h1 of the upper middle passage 524a may be higher than the height h2 of the lower middle passage 524b. The upper middle passage 524a is formed such that the depth may be approximately similar to the depth of the lower middle passage 524b. The upper middle passage 524a is formed such that a vertical cross-sectional area may be larger than the vertical cross-sectional area of the lower middle passage 524b. Therefore, the volume of the upper middle passage 524a becomes larger than that of the lower middle passage 524b. The fuel provided to the middle passage 524 stays in the upper middle passage 524a for a longer time. The fuel provided to the middle passage 524 is provided to the unit sections 121 via the lower inlet openings of the unit sections 121, and flows upwardly, thereby affecting the electricity generating reaction. Furthermore, the fuel is discharged to the outside of the unit sections 121 via the upper discharge opening of the unit sections 121. Therefore, in the middle plate 520, the temperature of the upper portion becomes higher than that of the lower portion. Since the middle passage 524 allows the fuel to remain in the upper middle passage 524a for a longer time, the temperature of the fuel may be increased more efficiently.

The height and depth of the upper middle passage 524a may be higher and deeper than those of the lower middle passage 524b. The upper middle passage 524a is formed such that it may be deeper than that of the lower middle passage 524b. Therefore, the upper middle passage 524a is formed such that the vertical cross-sectional area of it may be larger than that of the lower middle passage 524b. Here, the vertical cross-sectional area denotes the cross-sectional area orthogonal to the direction in which a passage extends.

The supply passage 125 may extend from the fourth surface 520d towards the third surface 520c, in parallel with the first surface 520a inside the lower portion of the middle plate 520.

The discharge passage 126 may extend from the third surface 520c towards the fourth surface 520d, in parallel with the first surface 520a inside the upper portion of the middle plate 520.

The supply opening 127 is formed on the fifth surface 520e of the middle plate 520, and is coupled to the middle passage 524.

The discharge opening 128 is formed on the fifth surface 520c of the middle plate 520, and is coupled to the discharge passage 126.

Figure 11:
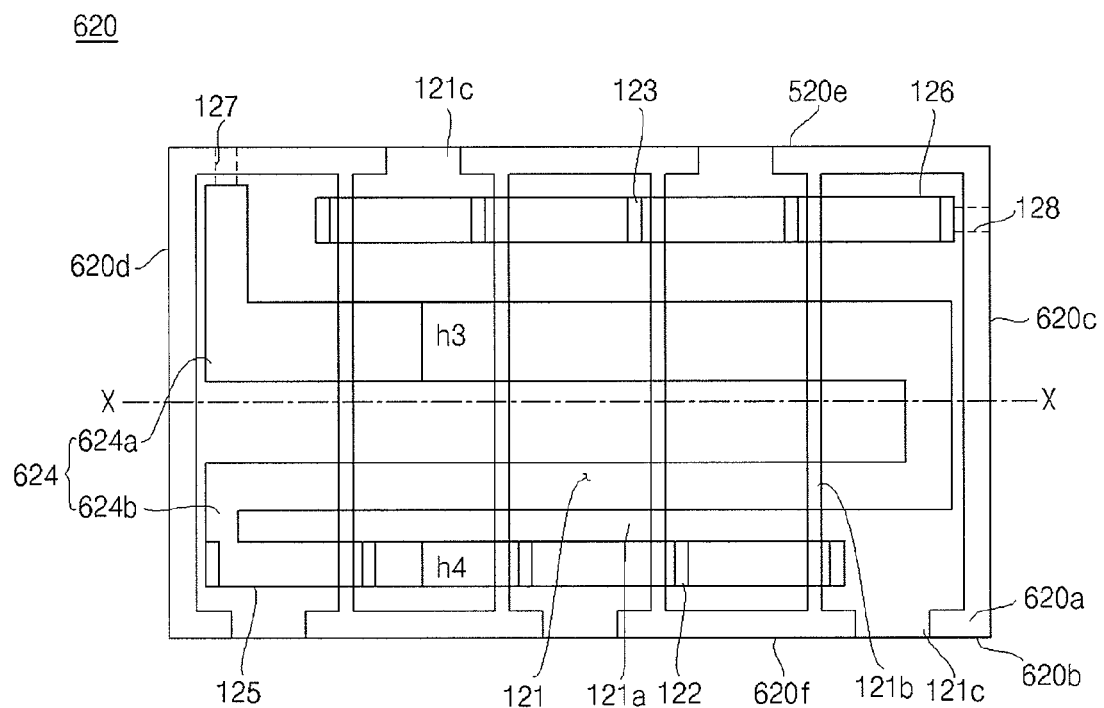
FIG. 11 is a front view illustrating a middle plate of a fuel cell system according to still another embodiment.

Next, the fuel cell system according to the still another embodiment will be explained. FIG. 11 is a front view illustrating a middle plate 620 of a fuel cell system according to still another embodiment.

The fuel cell system according to the present embodiment comprises a fuel cell body having a middle plate 620. The fuel cell system may further comprise a case 140 covering a plurality of unit cells 130 arranged on the middle plate, the fuel cell body, a fuel tank 180, and a fuel pump 190. The fuel cell system according to the present embodiment is formed differently compared with the fuel cell system 100 according to FIG. 1-FIG. 6 and described above in terms of the structure of the middle plate. Therefore, explanation about the fuel cell system according to the present embodiment of the present invention will concentrate on the middle plate 620 of the fuel cell body, and only the drawing related to the middle plate 620 will be illustrated. Furthermore, the parts of the fuel cell system which are same or similar to the fuel cell system 100 according to FIG. 1-FIG. 6 are denoted by the identical numerals, and detailed explanations thereof are omitted.

The middle plate 620 comprises a plurality of unit sections 121, inlet openings 122, outlet openings 123, a middle passage 624, a supply passage 125, a discharge passage 126, a supply opening 127 and a discharge opening 128. In the middle plate 620, the size of the upper middle passage 624a formed on upper portion of the middle plate 620b is larger than that of the supply passage 125. Therefore, since the fuel provided to the middle passage 624 stays in the upper middle passage 624a having a comparatively larger volume for a longer time, the temperature of the fuel becomes more uniform.

The middle plate 620 is formed in an approximate plane shape. Referring to FIG. 11, in the middle plate 620 is formed in an approximate rectangular form that is wider than high. The middle plate 620 comprises a first surface 620a, a second surface 620b, a third surface 620c, a fourth surface 620d, a fifth surface 620e, and a sixth surface 620f. The first surface 620a and the second surface 620b denote the front surface and a back surface of the middle plate 620 on which the unit cells 130 are arranged, respectively. The third surface 620c denotes a side surface of the middle plate 620 where a discharge opening 128 is formed. The fourth surface 620d denotes a side surface of the middle plate 620 facing the third surface 620c. The fifth surface 620e denotes the upper surface of the middle plate 620 in which a supply opening 127 is formed. The sixth surface 620f denotes the lower surface of the middle plate 620.

Unit sections 121 are formed on first surface 620a and the second surface 620b of the middle plate 620 at a predetermined interval, comprising a coupling groove 121a of a groove shape. The unit sections 121 are distinguished from the other unit sections 121 by a protrusion 121b surrounding the coupling groove 121a. Furthermore, in the coupling groove 121a, the terminal groove 121c from which a terminal of the unit cell 130 extends is formed on the upper portion or the lower portion of the middle plate 120.

The inlet openings 122 and the outlet openings 123 are formed as groove shaped openings on the bottom of the coupling groove 121a. The inlet openings 122 and the outlet openings 123 are spaced apart from each other so that the fuel provided to the unit sections 121 may be supplied to the entire unit cell 130.

The middle passage 624 is formed in a zigzag or serpentine shape inside the region in which the unit section 121 is formed between the first surface 620a and the second surface 620b of the middle plate 620. The middle passage 624 connects the supply opening 127 and the supply passage 125.

The middle passage 624 comprises an upper middle passage 624a, a lower middle passage 624b, and a plurality of vertical middle passages 624c, 624d and 624e. The upper middle passage 624a is formed in the horizontal direction on the upper portion of the middle plate 620 above the line X-X. Further, the lower middle passage 624b is formed in the horizontal direction on the lower portion below the line X-X. The line X-X divides the middle plate 620 into the upper portion and the lower portion, and is an imaginary line which generally at the vertical center of the middle plate 620. Furthermore, in connection with the middle plate 620, only one upper middle passage 624a, and one lower middle passage 624b are formed in the drawings, but a plurality of passages may be formed depending on the size of the middle plate and the size of the middle passage.

The height h3 of the upper middle passage 624a may be higher than the height h4 of the supply passage 125. The depth of the upper middle passage 624a may be approximately similar to that of the lower middle passage 624b. That is, the upper middle passage 624a is formed such that a vertical cross-sectional area may be larger than a vertical cross-sectional area of the supply passage 125. Therefore, the volume of the upper middle passage 624a becomes larger than that of the supply passage 125. The fuel provided to the middle passage 624 stays in the upper middle passage 624a for a longer time. The fuel provided to the middle passage 624 is provided to the unit sections 121 via the lower inlet openings of the unit sections 121, and flows upwardly, thereby affecting the electricity generating reaction. Further, the fuel is discharged to the outside of the unit sections 121 via the upper discharge opening of the unit sections 121. Therefore, in the middle plate 620, the temperature of the upper portion becomes higher than that of the lower portion. Since the middle plate 620 allows the fuel to remain in the upper middle passage 624a for a longer time, the temperature of the fuel may be increased more efficiently.

The supply passage 125 may extend from the fourth surface 620d towards the third surface 620c, in parallel with the first surface 620a inside the lower portion of the middle plate 620.

The discharge passage 126 may extend from the third surface 620c towards the fourth surface 620d, in parallel with the first surface 620a inside the upper portion of the middle plate 620.

The supply opening 127 is formed on the fifth surface 620e of the middle plate 620, and is coupled to the middle passage 624.

The discharge opening 128 is formed on the fifth surface 620c of the middle plate 620, and is coupled to the discharge passage 126.

Next, an embodiment of a method for operating a fuel cell system will be explained. Below, explanation will be made by focusing on the operations of the fuel cell system according to the embodiment of FIG. 1-FIG. 6.

The fuel pump 190 provides fuel stored in the fuel tank to the fuel cell body 110. The fuel supplied to the fuel cell body 110 is provided to the middle passage 124 via the supply opening 127. The middle passage 124 supplies the fuel to the supply passage 125. The supply passage 125 supplies the fuel to the lower portion of the coupling groove 121a of each of the unit sections 121 via the inlet openings 122. Here, the fuel is provided in sequence from the coupling groove 121a of each unit cell proximal to the fourth surface 120d to the coupling groove 121a of each unit cell proximal to the third surface 120c.

The fuel passageway 132 of the anode part 131 allows the fuel to be distributed over the entire first electrode 135a of MEA 135 and to the upper portion of the coupling groove 121a. On the other hand, the air passageway 138 of the cathode part 137 provides the air from the outside by convention to the second electrode 135b of MEA 135. In the unit cell 130, the electricity generating reaction proceeds by a reaction between the fuel and oxygen. The entire temperature of the middle plate 120 increases as the electricity generating reaction proceeds in the unit cell 130. Therefore, the fuel within the middle passage 124 flows to the supply passage 125 while the temperature is increasing by the heat of the middle plate 130. The heated fuel flows to each unit cell 130, and thus, the entire electricity generating reaction is proceeds uniformly.

The fuel which is used for the electricity generating reaction in each of the unit sections 121 is transferred to the outlet passage 126 via the outlet opening 123. The outlet passage 126 allows the discharged fuel to be discharged to the outside of the middle plate 120 via the discharge opening 128.

In the fuel cell system according to FIG. 8A-8C, in connection with the middle passage 324, the first passage 324c coupled from the supply opening 327 is formed adjacent to the outlet passage 126. The fuel within the first passage 324c may efficiently absorb heat of the fuel flowing through the outlet passage 126. Therefore, the middle passage 324 increases the temperature of the fuel provided from outside more efficiently.

In the fuel cell system according to FIG. 10, in connection with the middle passage 524, the vertical cross-sectional area of the upper middle passage 524a coupled from the supply opening 127 may be larger than that of the lower middle passage 524b. The increased volume of the upper middle passage 524a relatively increases the time during which the fuel remains therein. Therefore, the middle passage 524 increases the temperature of the fuel provided to the unit cell 130 more efficiently.

Furthermore, in the fuel cell system according to FIG. 11, in connection with the middle passage 624, the vertical cross-sectional area of the upper middle passage 624a coupled from the supply opening 127 may be relatively larger than that of the supply passage 125. The increased volume of the upper middle passage 624a relatively increases the time during which the fuel remains therein. Therefore, the middle passage 624 increases the temperature of the fuel provided to the unit cell 130 more efficiently.

As illustrated above, the present disclosure is not limited to the above embodiments, and it is to be noted that various modifications may be realized by the person skilled in the art without deviating the scope thereof, which is defined in the claims and equivalents thereof.

What is claimed is:

1. A fuel cell system, comprising:
   a fuel cell configured to generate electricity by reaction between fuel and air, wherein the fuel cell includes:
      a middle plate comprising a plurality of unit sections;
      an inlet opening formed in each unit section, the inlet opening configured for fuel provided thereto;
      an outlet opening formed in each unit section, the outlet openings configured for discharging unreacted fuel therefrom;
      a supply passage in fluid communication with the inlet openings;
      a middle passage in fluid communication with the supply passage;
      a discharge passage in fluid communication with the outlet openings and in fluid communication with discharge openings, the discharge passage and the discharge openings configured to receive unreacted fuel from the outlet openings;
      a supply opening in fluid communication with the middle passage and configured for receiving fuel thereto; and
      a unit cell connected to at least one of the plurality of unit sections.

2. The fuel cell system of claim 1, wherein the middle plate comprises:
   a first surface which is a front surface;
   a second surface which is a back surface;
   a third surface which is a first side surface;
   a fourth surface which is a second side surface;
   a fifth surface which is an upper edge surface; and
   a sixth surface which is a lower edge surface, wherein the unit section comprises a groove-shaped coupling groove, and unit sections are disposed on the first surface and the second surface.

3. The fuel cell system of claim 2, wherein
   the supply passage extends towards the third surface from the fourth surface inside the lower portion of the middle plate;
   the discharge passage extends towards the fourth surface from the third surface inside of the upper portion of the middle plate; and
   the middle passage comprises a zigzag or serpentine shape inside of the middle plate.

4. The fuel cell system of claim 3, wherein
   the supply opening is formed on a side of the fifth surface, and
   the discharge opening is formed on an upper portion of the third surface and is coupled to a side of the discharge passage; and
   the middle passage comprises a first passage extending from the supply opening towards the sixth surface; a second passage extending from the first passage towards the third surface; a third passage extending from the second passage towards the sixth surface; a fourth passage extending from the third passage towards the fourth surface; and a fifth passage extending from the fourth passage towards the sixth surface direction and coupled to the supply opening.

5. The fuel cell system of claim 4, wherein the middle passage comprises a trench-shaped middle groove disposed on the first surface of the middle plate, and a middle groove cover corresponding in shape and dimension to the middle groove and coupled to the middle groove.

6. The fuel cell system of claim 4, wherein
   the middle plate comprises a first plate and a second plate facing each other; and
   the middle passage is formed by coupling a first groove and a correspondingly shaped second groove disposed on the facing surfaces of the first plate and the second plate, respectively.

7. The fuel cell system of claim 6, wherein
   the supply passage is formed by a third groove and a correspondingly shaped fourth groove disposed on the facing surfaces of the first plate and the second plate, respectively; and
   the discharge opening is formed by a fifth groove and a correspondingly shaped sixth groove disposed on the facing surfaces of the first plate and the second plate, respectively.

8. The fuel cell system of claim 3, wherein
   the supply opening and the discharge opening are formed on the third surface; and
   the middle passage comprises a first passage coupled to the supply opening, extending towards the fourth surface in parallel with the discharge passage.

9. The fuel cell system of claim 8, wherein
   the middle passage comprises a second passage extending towards the sixth surface from the first passage;
   a third passage extending towards the third surface from the second passage;
   a fourth passage extending towards the sixth surface from the third passage;
   a fifth passage extending towards the fourth surface from the fourth passage; and
   a sixth passage extending towards the sixth from fifth passage and coupled to the supply passage.

10. The fuel cell system of claim 3, wherein
the supply opening is formed on a side of the fifth surface;
the discharge opening is adjacent to the supply opening on the fifth surface, and is coupled to the discharge passage; and
the middle passage comprises
  a first passage extending towards the sixth surface from the supply opening;
  a second passage extending towards the third surface from the first passage;
  a third passage extending towards the sixth surface from the second passage;
  a fourth passage extending towards fourth surface from the third passage; and
  a fifth passage extending towards the sixth direction from fourth passage and coupled to the supply passage.

11. The fuel cell system of claim 3, wherein
the middle passage comprises an upper middle passage formed on an upper portion of the middle plate, a lower middle passage formed on a lower portion of the middle plate, and a plurality of vertical middle passages coupled to the upper and the lower middle passages;
the upper middle passage is higher than the lower middle passage; and
the upper portion and lower portion of the middle plate are defined by a horizontal line bisecting the middle plate.

12. The fuel cell system of claim 11, wherein
the supply opening is formed on a side of the fifth surface,
the discharge opening is formed adjacent to the supply opening on the side of the fifth surface, and is coupled to the discharge passage.

13. The fuel cell system of claim 3, wherein
the middle passage comprises an upper middle passage formed on an upper portion of the middle plate, a lower middle passage formed on a lower portion of the middle plate, and a plurality of vertical middle passages coupled to the upper and the lower middle passages; and
a cross-sectional area of the upper middle passage is larger than a cross-sectional area of the lower middle passage,
wherein the upper portion and lower portion of the middle plate are defined by a horizontal line bisecting the middle plate.

14. The fuel cell system of claim 13, wherein
the supply opening is formed on a side of the fifth surface, and
the discharge opening is adjacent to the supply opening on the side of the fifth surface, and is coupled to the discharge passage.

15. The fuel cell system of claim 3, wherein
the middle passage comprises an upper middle passage formed on an upper portion of the middle plate; a lower middle passage formed on a lower portion of the middle plate; and a plurality of vertical middle passages coupled to the upper and the lower middle passages; and
the upper middle passage is higher than the supply passage,
wherein the upper portion and lower portion of the middle plate are defined by a horizontal line bisecting the middle plate.

16. The fuel cell system of claim 15, wherein
the supply opening is formed on a side of the fifth surface, and
the discharge opening is adjacent to the supply opening on the side of the fifth surface, and is coupled to the discharge passage.

17. The fuel cell system of claim 3, wherein
the middle passage comprises an upper middle passage formed on an upper portion; a lower middle passage formed on a lower portion of the middle plate; and a plurality of vertical middle passages coupled to the upper and the lower middle passages; and
a vertical cross-sectional area of the upper middle passage is larger than a vertical cross-sectional area of the supply passage,
wherein the upper portion and lower portion of the middle plate are defined by a horizontal line bisecting the middle plate.

18. The fuel cell system of claim 17, wherein the supply opening is formed on a side of the fifth surface, and the discharge opening is adjacent to the supply opening on the side of the fifth surface, and is coupled to the discharge passage.

19. The fuel cell system of claim 2, wherein the inlet openings are on a lower portion of the coupling groove of each of unit section proximal to the fourth surface.

20. The fuel cell system of claim 2, wherein the outlet openings are on the upper portion of the coupling groove of each of unit section proximal to the third surface.

21. The fuel cell system of claim 1, wherein the unit cell comprises:
  an anode part comprising a fuel passageway and arranged closely to the unit section;
  a membrane-electrode assembly arranged closely to the anode part; and
  a cathode part comprising an air passageway configured for allowing airflow therethrough and arranged closely to the membrane-electrode assembly.

22. The fuel cell system of claim 1, further comprising a case in which an air hole is formed on a region corresponding to the cathode part, and surrounding the fuel cell body entirely.

23. The fuel cell system of claim 1, further comprising a fuel pump configured for providing fuel to the fuel cell body, and a fuel tank coupled to the fuel pump.

* * * * *

UNITED STATES PATENT AND TRADEMARK OFFICE
CERTIFICATE OF CORRECTION

PATENT NO. : 7,691,520 B2  Page 1 of 1
APPLICATION NO. : 12/031095
DATED : April 6, 2010
INVENTOR(S) : Seongjin An et al.

It is certified that error appears in the above-identified patent and that said Letters Patent is hereby corrected as shown below:

At Column 1, Line 52, after "cells" insert --.--

At Column 27, Line 43, Claim 1, after "for" insert --receiving--.

Signed and Sealed this

Thirtieth Day of November, 2010

David J. Kappos
*Director of the United States Patent and Trademark Office*